(12) United States Patent
Ramakrishnan et al.

(10) Patent No.: US 11,577,439 B2
(45) Date of Patent: Feb. 14, 2023

(54) DIE DESIGN FOR PROPERTY ENHANCEMENT

(71) Applicant: SHPP Global Technologies B.V., Bergen op Zoom (NL)

(72) Inventors: Vaidyanath Ramakrishnan, Bergen op Zoom (NL); Bruke Danniel Jofore, Bergen op Zoom (NL); Johannes Gerardus Petrus Goossens, Heeswijk-Dinther (NL); Pieter Jan Antoon Janssen, Rijsbergen (NL); Hans Looij, Bergen op Zoom (NL)

(73) Assignee: SHPP Global Technologies B.V., Bergen op Zoom (NL)

( * ) Notice: Subject to any disclaimer, the term of this patent is extended or adjusted under 35 U.S.C. 154(b) by 540 days.

(21) Appl. No.: 16/473,736

(22) PCT Filed: Dec. 27, 2017

(86) PCT No.: PCT/IB2017/058439
§ 371 (c)(1),
(2) Date: Jun. 26, 2019

(87) PCT Pub. No.: WO2018/122747
PCT Pub. Date: Jul. 5, 2018

(65) Prior Publication Data
US 2021/0008781 A1    Jan. 14, 2021

Related U.S. Application Data

(60) Provisional application No. 62/439,286, filed on Dec. 27, 2016.

(51) Int. Cl.
*B29C 48/70* (2019.01)
*B29C 48/16* (2019.01)
(Continued)

(52) U.S. Cl.
CPC ............ *B29C 48/705* (2019.02); *B29C 48/00* (2019.02); *B29C 48/05* (2019.02); *B29C 48/07* (2019.02);
(Continued)

(58) Field of Classification Search
CPC ....... B29C 48/69; B29C 48/695; B29C 48/70; B29C 48/705; B29C 48/00; B29C 48/05;
(Continued)

(56) References Cited

U.S. PATENT DOCUMENTS 3,933,734 A   1/1976  Mark et al.
3,981,657 A * 9/1976  Orso .................. B28B 3/206
                                                  425/198
(Continued)

FOREIGN PATENT DOCUMENTS

CN    1141843 A     2/1997
CN    1711374 A    12/2005
(Continued)

OTHER PUBLICATIONS

U.S. Appl. No. 16/518,068, filed Jul. 22, 2019, Ramakrishnan et al.
(Continued)

*Primary Examiner* — Jeffrey M Wollschlager
(74) *Attorney, Agent, or Firm* — Quicker Law, LLC

(57) ABSTRACT

Provided are extrusion dies having entrance, orientation, merging (205), and exit (211) sections, which dies may be used to produce fibers having, e.g., oriented reinforcement materials (e.g., PTFE) dispersed within. The dies provide fibers having enhanced mechanical and processing properties. The orientation section comprises orientation channels (203) wherein a ratio of a cross-sectional area having of the channel inlet to a cross-sectional area of the channel outlet is between 2 and 45.

16 Claims, 19 Drawing Sheets

(51) Int. Cl.

| | |
|---|---|
| *B29C 48/05* | (2019.01) |
| *B29C 48/07* | (2019.01) |
| *B29C 48/12* | (2019.01) |
| *B29C 48/00* | (2019.01) |
| *B29C 48/30* | (2019.01) |
| *B29C 48/06* | (2019.01) |
| *B29K 67/00* | (2006.01) |
| *B29K 101/12* | (2006.01) |
| *B29K 227/18* | (2006.01) |

(52) U.S. Cl.
CPC .............. *B29C 48/12* (2019.02); *B29C 48/16* (2019.02); *B29C 48/30* (2019.02); *B29C 48/022* (2019.02); *B29C 48/06* (2019.02); *B29K 2067/006* (2013.01); *B29K 2101/12* (2013.01); *B29K 2227/18* (2013.01)

(58) Field of Classification Search
CPC ......... B29C 48/07; B29C 48/12; B29C 48/16; B29C 48/30; B29C 48/022; B29C 48/06; B29K 2067/006; B29K 2101/12; B29K 2227/18; B29K 2027/18; B29K 2105/12; B29K 2823/0683
See application file for complete search history.

(56) References Cited

U.S. PATENT DOCUMENTS

| | | | | |
|---|---|---|---|---|
| 4,015,924 | A | * | 4/1977 | LaNieve .................. D01D 4/02 425/464 |
| 4,332,759 | A | * | 6/1982 | Ide ............................. C08J 5/18 264/108 |
| 4,734,240 | A | * | 3/1988 | Chung ................... B29C 48/87 264/211.13 |
| 5,962,587 | A | | 10/1999 | Gaggar et al. |
| 7,557,154 | B2 | | 7/2009 | Agarwal et al. |
| 9,115,448 | B2 | * | 8/2015 | Meijer .................... B29C 48/05 |
| 10,400,080 | B2 | | 9/2019 | Ramakrishnan et al. |
| 2003/0111762 | A1 | * | 6/2003 | Floyd ..................... B29C 48/71 264/136 |
| 2007/0108229 | A1 | | 5/2007 | Fork et al. |
| 2010/0069543 | A1 | | 3/2010 | Monden et al. |
| 2011/0227247 | A1 | | 9/2011 | Meijer et al. |
| 2012/0025962 | A1 | * | 2/2012 | Toll .......................... B60Q 1/50 340/431 |
| 2013/0040521 | A1 | | 2/2013 | Cuculo et al. |
| 2013/0099412 | A1 | * | 4/2013 | Komori ................ B29C 48/385 264/177.12 |
| 2017/0029059 | A1 | | 2/2017 | Liu et al. |
| 2018/0201777 | A1 | | 7/2018 | Leenders et al. |

FOREIGN PATENT DOCUMENTS

| | | | |
|---|---|---|---|
| CN | 102257202 | A | 11/2011 |
| CN | 103541025 | A | 1/2014 |
| EP | 0267719 | A2 | 5/1988 |
| EP | 0992335 | A2 | 4/2000 |
| EP | 2103654 | A1 | 9/2009 |
| GB | 609753 | * | 10/1948 |
| GB | 734521 | A | 8/1955 |
| WO | WO9411177 | * | 5/1994 |

OTHER PUBLICATIONS

Uitert et al.; "Subvoxel precise skeletons of volumetric data based on fast marching methods"; Medical Physics; vol. 34 Issue 2; Feb. 2007; p. 627-638 (abstract only).

International Patent Application No. PCT/IB2017/058439; Int'l Search Report and the Written Opinion; dated Mar. 29, 2018; 12 pages.

International Patent Application No. PCT/IB2017/058439; Int'l Preliminary Report on Patentability; dated Jul. 11, 2019; 8 pages.

Shen, K, Editor-in-Chief. "Plastic Molding Mould Version 2", China Light Industry Press, Jan. 31, 2011, pp. 310-312.

* cited by examiner

DIE DESIGN FOR PROPERTY ENHANCEMENT

CROSS-REFERENCE TO RELATED APPLICATION

This application is the National Stage of International Application No. PCT/IB2017/058439 filed Dec. 27, 2017, which claims the benefit of U.S. Provisional Application No. 62/439,286 filed Dec. 27, 2016, the disclosures of which are incorporated herein by this reference in their entireties.

TECHNICAL FIELD

The present disclosure relates to the field of extrusion dies and to the field of polymeric fibers.

BACKGROUND

Efforts have been made in forming high-performance polymer fibers, but these efforts have not always yielded fibers having the optimal blend of mechanical properties and processability. Some of these efforts have included attempts to utilize fibrillated materials, but these attempts have met with only limited success. Accordingly, there is a long-felt need in the art for improved dies and related methods for forming improved fiber materials.

SUMMARY

The present disclosure provides novel extrusion dies that alter the flow field at the exit of an extruder or injection molding machine so as to enhance the properties (e.g., flame resistance, mechanical properties) of the die products. A die may have a section for creating a strong orienting flow at the entrance to the die and a merging region where oriented structures are further processed (e.g., flows are merged) before exiting the die. The effect of this flow field on the microstructure of (semi-)crystalline and amorphous polymers and blends thereof has been demonstrated by showing improved mechanical properties in products produced by the dies. The flow-induced orientation of the material by the dies enhances the fibrillation of a reinforcement phase dispersed in the feed to the die, e.g., polytetrafluoroethylene (PTFE) and ultra-high molecular weight polyethylene (UHMWPE).

With specific regard to PTFE and UHMWPE, some have tried to fibrillate these materials with a screw extrusion process. Existing technologies, however, are limited in their ability to fibrillate these and other materials.

The present disclosure provides solutions to these and other problems in the field. In one aspect, the present disclosure provides dies, comprising: an entrance section comprising at least one inlet; the inlet being in fluid communication with an orientation section of the die, the orientation section comprising a plurality of orientation channels having an inlet and an outlet, at least some of the plurality of orientation channels independently having an elongation ratio of between about 2 and about 45, the elongation ratio being defined as the ratio of the cross-sectional area of the channel inlet to the cross-sectional area of the channel outlet; a merging region, the merging region defining a receiving volume in fluid communication with the outlets of the plurality of orientation channels of the orientation section, the merging region being configured to merge together at least some fluid flows originating from the outlets of the orientation channels of the orientation section; and an exit region in fluid communication with the merging region, the exit region comprising at least one outlet.

Also provided are extruders, the extruders being in fluid communication with a die according to the present disclosure.

Also provided are methods of product manufacture, comprising: communicating a molten feed composition comprising a thermoplastic matrix polymer through a die according to the present disclosure so as to give rise to a die product.

Also provided are die products, the die products comprising a thermoplastic matrix polymer communicated through a die according to the present disclosure.

BRIEF DESCRIPTION OF THE DRAWINGS

The following is a brief description of the drawings wherein like elements are numbered alike and which are exemplary of the various aspects described herein.

DETAILED DESCRIPTION OF ILLUSTRATIVE EMBODIMENTS

Figure 1:
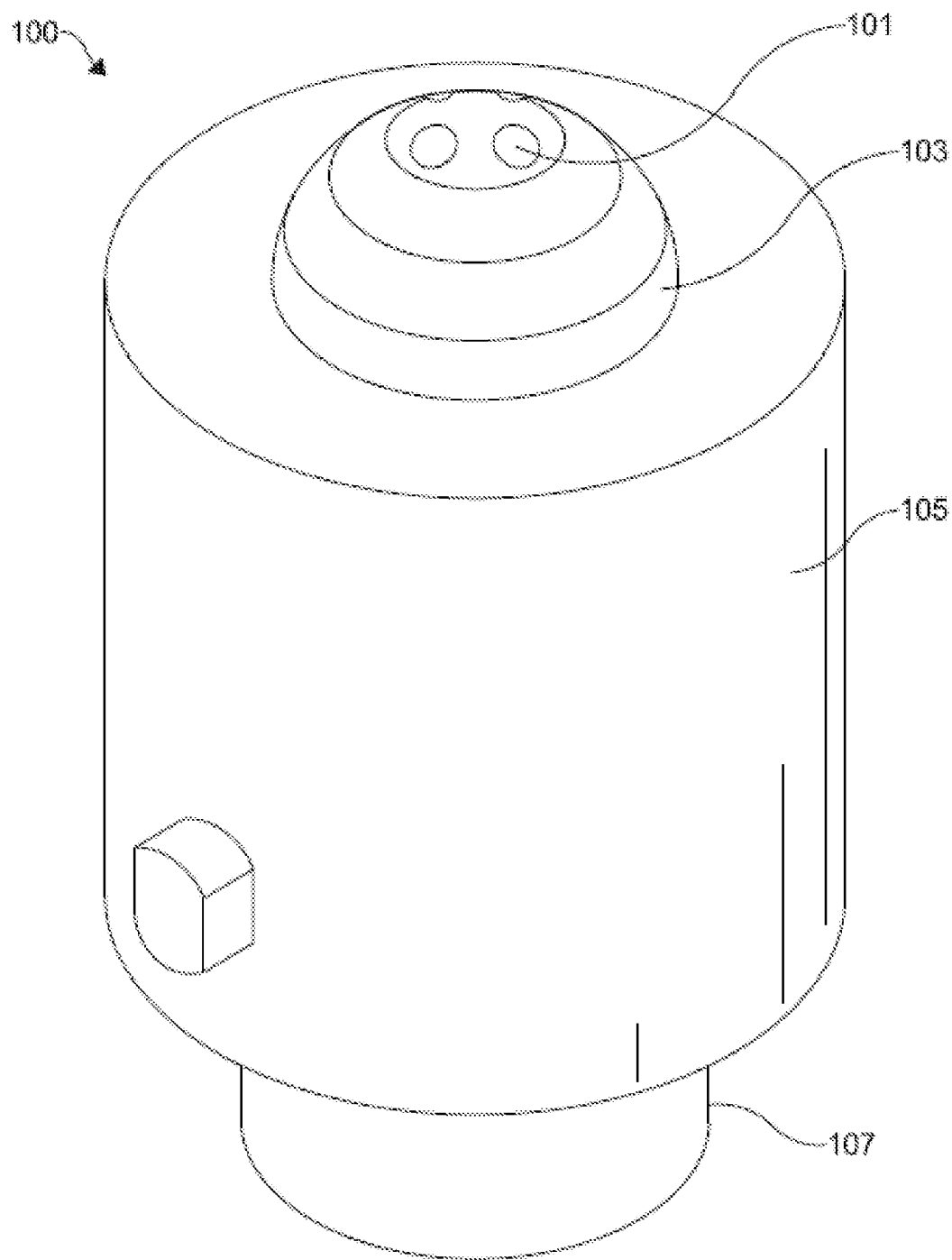
FIG. 1 provides an exterior view of an exemplary die according to the present disclosure.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise. As used in the specification and in the claims, the term "comprising" may include the aspects "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps. It is to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

Numerical values in the specification and claims of this application, particularly as they relate to polymers or polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams (g) to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9 to 1.1. Other meanings of "about" may be apparent from the context, such as rounding off, so, for example "about 1" may also mean from 0.5 to 1.4.

As used herein, "Tm" refers to the melting point at which a polymer completely loses its orderly arrangement. As used herein, "Tc" refers to the crystallization temperature at which a polymer gives off heat to form a crystalline arrangement. The terms "Glass Transition Temperature" or "Tg" may be measured by e.g. using a differential scanning calorimetry method and are expressed in degrees Celsius.

As used herein, "matrix polymer component" refers to one or more polymers (suitably thermoplastic) that are processed on their own in the disclosed dies or processed in the dies as carriers (i.e., matrices) for one or more of the reinforcement materials described herein. A matrix polymer may be a pure polymer, a copolymer, or even a blend of polymers. Examples of suitable matrix polymers include, but are not limited to, amorphous, crystalline, and semi-crystalline thermoplastic materials such as polyolefins (for example, linear or cyclic polyolefins such as polyethylene, chlorinated polyethylene, polypropylene, and the like); polyesters (for example, polyethylene terephthalate, polybutylene terephthalate, polycyclohexylmethylene terephthalate, and the like); arylate esters; polyamides; polysulfones (including hydrogenated polysulfones, and the like); polyimides; polyetherimides; polyether sulfones; polyphenylene sulfides; polyether ketones; polyether ether ketones; ABS resins; polystyrenes (for example hydrogenated polystyrenes, syndiotactic and atactic polystyrenes, hydrogenated polystyrenes such as polycyclohexyl ethylene, styrene-co-acrylonitrile, styrene-co-maleic anhydride, and the like); polybutadiene; polyacrylates (for example, polymethylmethacrylate (PMMA), methyl methacrylate-polyimide copolymers, and the like); polyacrylonitrile; polyacetals; polycarbonates; polyphenylene ethers (for example, those derived from 2,6-dimethylphenol and copolymers with 2,3, 6-trimethylphenol, and the like); ethylene-vinyl acetate copolymers; polyvinyl acetate; liquid crystalline polymers; fluoropolymers such as ethylene-tetrafluoroethylene copolymer, polyvinyl fluoride, and polyvinylidene fluoride, polytetrafluoroethylene (provided that the fluoropolymer has a lower softening temperature than the fluoropolymer component described below); polyvinyl chloride, polyvinylidene chloride; and combinations comprising at least one of the foregoing polymers. The matrix polymer may generally be provided in any form, including but not limited to powders, plates, pellets, flakes, chips, whiskers, and the like.

The thermoplastic matrix material may has a melting temperature or, where applicable, a Tg, that is below the melting temperature or Tg (where applicable) of a reinforcement material (discussed elsewhere herein) dispersed within the thermoplastic matrix material.

As used herein, "reinforcement material" refers to one or more materials that are suitably dispersed within the matrix polymer component, which materials are then fibrillated or otherwise aligned and/or oriented with passage through the die. Fluoropolymers (e.g., PTFE) are considered suitable reinforcement materials, Other suitable reinforcement materials include polyolefins (e.g., UHMW-PE) or any combination thereof. The reinforcement material may be present at from about 0.01 wt % to about 15 wt % as measured against the total weight of the matrix polymer component and the reinforcement material.

Fluoropolymers suitable for use as the fibrillated fluoropolymer component of the disclosure are capable of being fibrillated ("fibrillatable") during mixing with the matrix polymer, the filler, or both simultaneously. "Fibrillation" is a term of art that refers to the treatment of fluoropolymers so as to produce, for example, a "node and fibril," network, or cage-like structure. In one aspect, the fluoropolymer comprises fibrils having an average diameter of 5 nanometers (nm) to 2 micrometers ($\mu$m), or from about 5 nm to about 2 $\mu$m. The fluoropolymer may also have an average fibril diameter of 30 nanometers to 750 nanometers, more specifically 5 nanometers to 500 nanometers. In a further example, the fluoropolymer may also have an average fibril diameter of about 30 nanometers to about 750 nanometers, more specifically about 5 nanometers to about 500 nanometers. Field Emission Scanning Electron Microscopy can be employed to observe the extent of fibrillation of the fluoropolymer throughout the matrix polymer in the fibrillated compositions.

Suitable fluoropolymers are described in, e.g., U.S. Pat. No. 7,557,154 and include but are not limited to homopolymers and copolymers that comprise structural units derived from one or more fluorinated alpha-olefin monomers, that is, an alpha-olefin monomer that includes at least one fluorine atom in place of a hydrogen atom. In one aspect the fluoropolymer comprises structural units derived from two or more fluorinated alpha-olefin, for example tetrafluoroethylene, hexafluoroethylene, and the like. In another aspect, the fluoropolymer comprises structural units derived from one or more fluorinated alpha-olefin monomers and one or more non-fluorinated monoethylenically unsaturated monomers that are copolymerizable with the fluorinated monomers, for example alpha-monoethylenically unsaturated copolymerizable monomers such as ethylene, propylene, butene, acrylate monomers (e.g., methyl methacrylate and butyl acrylate), vinyl ethers, (e.g., cyclohexyl vinyl ether, ethyl vinyl ether, n-butyl vinyl ether, vinyl esters) and the like. Specific examples of fluoropolymers include polytetrafluoroethylene, polyhexafluoropropylene, polyvinylidene fluoride, polychlorotrifluoroethylene, ethylene tetrafluoroethylene, fluorinated ethylene-propylene, polyvinyl fluoride, and ethylene chlorotrifluoroethylene. Combinations comprising at least one of the foregoing fluoropolymers may also be used. Polytetrafluoroethylene (PTFE) is considered especially suitable.

As is known, fluoropolymers are available in a variety of forms, including powders, emulsions, dispersions, agglomerations, and the like. "Dispersion" (also called "emulsion") fluoropolymers are generally manufactured by dispersion or emulsion, and may comprise 25 to 60 weight percent (wt. %), or about 25 wt. % to 60 wt. %, fluoropolymer in water, stabilized with a surfactant, wherein the fluoropolymer particles are 0.1 to 0.3 micrometers (microns, $\mu$m), or about 0.1 $\mu$m to about 0.3 $\mu$m in diameter. "Fine powder" (or "coagulated dispersion") fluoropolymers may be made by coagulation and drying of dispersion-manufactured fluoropolymers. Fine powder fluoropolymers are generally manufactured to have a particle size of 400 to 500 $\mu$m, or about 400 $\mu$m to about 500 $\mu$m. "Granular" fluoropolymers may be made by a suspension method, and are generally manufactured in two different particle size ranges, including a median particle size of 30 to 40 $\mu$m, or about 30 $\mu$m to about 40 $\mu$m and a high bulk density product exhibiting a median particle size of 400 to 500 $\mu$m, or about 400 $\mu$m to about 500 $\mu$m. Pellets of fluoropolymer may also be obtained and cryogenically ground to exhibit the desired particle size.

A fluoropolymer may be at least partially encapsulated by an encapsulating polymer that may be the same as or different from the matrix polymer (hereinafter referred to as an "encapsulated polymer"). Without being bound by theory, it is believed that encapsulation may aid in the distribution of the fluoropolymer within the matrix, and/or compatibilize the fluoropolymer with the matrix.

Suitable encapsulating polymers accordingly include, but are not limited to, vinyl polymers, acrylic polymers, polyacrylonitrile, polystyrenes, polyolefins, polyesters, polyurethanes, polyamides, polysulfones, polyimides, polyetherimides, polyphenylene ethers, polyphenylene sulfides, polyether ketones, polyether ether ketones, acrylonitrile butadiene styrene (ABS) resins, polyethersulfones, poly (alkenylaromatic) polymers, polybutadiene, liquid crystalline polymers, polyacetals, polycarbonates, polyphenylene ethers, ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, and combinations comprising at least one of the foregoing polymers.

The encapsulating polymers may be obtained by polymerization of monomers or mixtures of monomers by methods known in the art, for example, condensation, addition polymerization, and the like. Emulsion polymerization, particularly radical polymerization may be used effectively. In one aspect, the encapsulating polymer is formed from monovinylaromatic monomers containing condensed aromatic ring structures, such as vinyl naphthalene, vinyl anthracene and the like. Examples of suitable monovinylaromatic monomers include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, and the like, and combinations comprising at least one of the foregoing compounds. Styrene and/or alpha-methylstyrene may be specifically mentioned. Other useful monomers for the formation of the encapsulating polymer include monovinylic monomers such as itaconic acid, acrylamide, N-substituted acrylamide or methacrylamide, maleic anhydride, maleimide, N-alkyl-, aryl-, or haloaryl-substituted maleimide, and glycidyl (meth)acrylates. Other monomers include acrylonitrile, ethacrylonitrile, methacrylonitrile, alpha-chloroacrylonitrile, beta-chloroacrylonitrile, alpha-bromoacrylonitrile, acrylic acid, methyl (meth)acrylate, ethyl (meth)acrylate, n-butyl (meth)acrylate, t-butyl (meth)

acrylate, n-propyl (meth)acrylate, isopropyl (meth)acrylate, 2-ethylhexyl (meth)acrylate, and the like, and combinations comprising at least one of the foregoing monomers.

Mixtures of the foregoing monovinylaromatic monomers and monovinylic monomers may also be used, for example mixtures of styrene and acrylonitrile (SAN). The relative ratio of monovinylaromatic and monovinylic monomers in the rigid graft phase may vary widely depending on the type of fluoropolymer, type of monovinylaromatic and monovinylic monomer(s), and the desired properties of the encapsulant. The encapsulant may generally be formed from up to 100 wt. %, or up to about 100 wt. %, of monovinyl aromatic monomer, specifically 30 to 100 wt. %, more specifically 50 to 90 wt. % monovinylaromatic monomer, with the balance being comonomer(s). In further examples, the encapsulant may generally be formed from up to about 100 wt. % of monovinyl aromatic monomer, specifically about 30 to about 100 wt. %, more specifically about 50 to about 90 wt. % monovinylaromatic monomer, with the balance being comonomer(s).

Elastomers may also be used as the encapsulating polymer, as well as elastomer-modified graft copolymers. Suitable elastomers include, for example, conjugated diene rubbers; copolymers of a conjugated diene with less than 50 wt. %, or less than about 50 wt. %, of a copolymerizable monomer; olefin rubbers such as ethylene propylene copolymers (EPR) or ethylene-propylene-diene monomer rubbers (EPDM); ethylene-vinyl acetate rubbers; silicone rubbers; elastomeric C1-8 alkyl (meth)acrylates; elastomeric copolymers of C1-8 alkyl (meth)acrylates with butadiene and/or styrene; or combinations comprising at least one of the foregoing elastomers.

Examples of conjugated diene monomers that may be used are butadiene, isoprene, 1,3-heptadiene, methyl-1,3-pentadiene, 2,3-dimethyl-1,3-butadiene, 2-ethyl-1,3-pentadiene; 1,3- and 2,4-hexadienes, and the like, as well as mixtures comprising at least one of the foregoing conjugated diene monomers. Specific conjugated diene homopolymers include polybutadiene and polyisoprene.

Copolymers of conjugated diene rubbers may also be used, for example those produced by aqueous radical emulsion polymerization of a conjugated diene and up to 10 wt. %, or up to about 10 wt. %, of one or more monomers copolymerizable therewith.

(Meth)acrylate monomers suitable for use as an elastomeric encapsulating monomer include the cross-linked, particulate emulsion homopolymers or copolymers of C4-8 alkyl (meth)acrylates, in particular C4-6 alkyl acrylates, for example n-butyl acrylate, t-butyl acrylate, n-propyl acrylate, isopropyl acrylate, 2-ethylhexyl acrylate, and the like, and combinations comprising at least one of the foregoing monomers. Exemplary comonomers include but are not limited to butadiene, isoprene, styrene, methyl methacrylate, phenyl methacrylate, phenethylmethacrylate, N-cyclohexylacrylamide, vinyl methyl ether or acrylonitrile, and mixtures comprising at least one of the foregoing comonomers. Optionally, up to 5 wt. % of a polyfunctional crosslinking comonomer may be present, for example divinylbenzene, alkylenediol di(meth)acrylates such as glycol bisacrylate, alkylenetriol tri(meth)acrylates, polyester di(meth)acrylates, bisacrylamides, triallyl cyanurate, triallyl isocyanurate, allyl (meth)acrylate, diallyl maleate, diallyl fumarate, diallyl adipate, triallyl esters of citric acid, triallyl esters of phosphoric acid, and the like, as well as combinations comprising at least one of the foregoing crosslinking agents.

Suitable elastomer-modified graft copolymers may be prepared by first providing an elastomeric polymer (for example, as described above), then polymerizing the constituent monomer(s) of the rigid phase in the presence of the fluoropolymer and the elastomer to obtain the graft copolymer. The elastomeric phase may provide 5 to 95 wt. % of the total graft copolymer, more specifically 20 to 90 wt. %, and even more specifically 40 to 85 wt. % of the elastomer-modified graft copolymer, the remainder being the rigid graft phase. In further examples, the elastomeric phase may provide about 5 to about 95 wt. % of the total graft copolymer, more specifically about 20 to about 90 wt. %, and even more specifically about 40 to about 85 wt. % of the elastomer-modified graft copolymer, the remainder being the rigid graft phase. Depending on the amount of elastomer-modified polymer present, a separate matrix or continuous phase of ungrafted rigid polymer or copolymer may be simultaneously obtained along with the elastomer-modified graft copolymer.

Specific encapsulating polymers include polystyrene, copolymers of polystyrene, poly(alpha-methylstyrene), poly (alpha-ethylstyrene), poly(alpha-propylstyrene), poly(alpha-butylstyrene), poly(p-methylstyrene), polyacrylonitrile, polymethacrylonitrile, poly(methyl acrylate), poly(ethyl acrylate), poly(propyl acrylate), and poly(butyl acrylate), poly(methyl methacrylate), poly(ethyl methacrylate), poly (propyl methacrylate), poly(butyl methacrylate); polybutadiene, copolymers of polybutadiene with propylene, poly (vinyl acetate), poly(vinyl chloride), poly(vinylidene chloride), poly(vinylidene fluoride), poly(vinyl alcohols), acrylonitrile-butadiene copolymer rubber, acrylonitrile-butadiene-styrene (ABS), poly(C4-8 alkyl acrylate) rubbers, styrene-butadiene rubbers (SBR), EPDM rubbers, silicon rubber and combinations comprising at least one of the foregoing encapsulating polymers. A preferred fluoropolymer is polytetrafluoroethylene.

Preferably, the encapsulating polymer comprises a styrene-acrylonitrile copolymer, an acrylonitrile-butadiene-styrene copolymer, alpha-alkyl-styrene-acrylonitrile copolymer, an alpha-methylstyrene-acrylonitrile copolymer, a styrene-butadiene rubber, a methyl methacrylate copolymer, or a combination thereof. In another aspect, the encapsulating polymer comprises SAN, ABS copolymers, alpha-(C1-3)alkyl-styrene-acrylonitrile copolymers, alpha-methylstyrene-acrylonitrile (AMSAN) copolymers, SBR, and combinations comprising at least one of the foregoing. In yet another aspect the encapsulating polymer is SAN or AMSAN. A preferred fluoropolymer encapsulated by an encapsulating polymer is styrene acrylonitrile encapsulated polytetrafluoroethylene.

Suitable amounts amount of encapsulating polymer may be determined by one of ordinary skill in the art without undue experimentation, using the guidance provided herein. In one aspect, the encapsulated fluoropolymer comprises 10 to 90 weight percent (wt. %), or about 10 to about 90 wt. %, fluoropolymer and 90 to 10 wt. %, or about 90 wt. % to about 10 wt. %, of the encapsulating polymer, based on the total weight of the encapsulated fluoropolymer. Alternatively, the encapsulated fluoropolymer comprises 20 to 80 wt. %, or about 20 to about 80 wt. %, more specifically 40 wt. % to 60 wt. %, or about 40 to about 60 wt. % fluoropolymer, and 80 wt. % to 20 wt. %, or about 80 to about 20 wt. %, specifically, 60 wt. % or 40 wt. %, or about 60 about 40 wt. % encapsulating polymer, based on the total weight of the encapsulated polymer.

Although the particular choice of matrix material and the particular choice of reinforcement material, when present, will be dictated by the user's needs and also by the specific use to which the die-made material will be put, it is especially suitable to select a combination of matrix material and reinforcement material such that the melting temperature of the matrix material is lower than the melting temperature of the reinforcement material. The material processed by a die according to the present disclosure is suitably at a temperature in the die that is above the melting temperature of the matrix material and below the melting temperature of the reinforcement material, when present. The temperature is also suitably below the degradation temperature of the material processed by the die.

Additives

The disclosed compositions may include one or more other additives may be present in the compositions described herein, as desired. Exemplary additives include: one or more polymers, ultraviolet agents, ultraviolet stabilizers, heat stabilizers, antistatic agents, anti-microbial agents, anti-drip agents, radiation stabilizers, pigments, dyes, fibers, fillers, plasticizers, fibers, flame retardants, antioxidants, lubricants, wood, glass, and metals, and combinations thereof.

Exemplary polymers that can be mixed with the compositions described herein include elastomers, thermoplastics, thermoplastic elastomers, and impact additives. The compositions described herein may be mixed with other polymers such as a polyester, a polyestercarbonate, a bisphenol-A homopolycarbonate, a polycarbonate copolymer, a tetrabromo-bisphenol A polycarbonate copolymer, a polysiloxane-co-bisphenol-A polycarbonate, a polyesteramide, a polyimide, a polyetherimide, a polyamideimide, a polyether, a polyethersulfone, a polyepoxide, a polylactide, a polylactic acid (PLA), an acrylic polymer, polyacrylonitrile, a polystyrene, a polyolefin, a polysiloxane, a polyurethane, a polyamide, a polyamideimide, a polysulfone, a polyphenylene ether, a polyphenylene sulfide, a polyether ketone, a polyether ether ketone, an acrylonitrile-butadiene-styrene (ABS) resin, an acrylic-styrene-acrylonitrile (ASA) resin, a polyphenylsulfone, a poly(alkenylaromatic) polymer, a polybutadiene, a polyacetal, a polycarbonate, an ethylene-vinyl acetate copolymer, a polyvinyl acetate, a liquid crystal polymer, an ethylene-tetrafluoroethylene copolymer, an aromatic polyester, a polyvinyl fluoride, a polyvinylidene fluoride, a polyvinylidene chloride, tetrafluoroethylene, or any combination thereof.

The additional polymer can be an impact modifier, if desired. Suitable impact modifiers may be high molecular weight elastomeric materials derived from olefins, monovinyl aromatic monomers, acrylic and methacrylic acids and their ester derivatives, as well as conjugated dienes that are fully or partially hydrogenated. The elastomeric materials can be in the form of homopolymers or copolymers, including random, block, radial block, graft, and core-shell copolymers.

A specific type of impact modifier may be an elastomer-modified graft copolymer comprising (i) an elastomeric (i.e., rubbery) polymer substrate having a Tg less than 10° C., or less than about 10° C., less than 0° C. or less than about 0° C., less than −10° C. or less than about −10° C., or between −40° C. to −80° C. or between about −40° C. to −80° C., and (ii) a rigid polymer grafted to the elastomeric polymer substrate. Materials suitable for use as the elastomeric phase include, for example, conjugated diene rubbers, for example polybutadiene and polyisoprene; copolymers of a conjugated diene with less than about 50 wt. % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_1$-$C_8$ alkyl(meth)acrylates; elastomeric copolymers of $C_1$-$C_8$ alkyl(meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_1$-$C_6$ esters of acrylic acid and methacrylic acid, specifically methyl methacrylate.

Specific impact modifiers include styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN). Exemplary elastomer-modified graft copolymers include those formed from styrene-butadiene-styrene (SBS), styrene-butadiene rubber (SBR), styrene-ethylene-butadiene-styrene (SEBS), ABS (acrylonitrile-butadiene-styrene), acrylonitrile-ethylene-propylene-diene-styrene (AES), styrene-isoprene-styrene (SIS), methyl methacrylate-butadiene-styrene (MBS), and styrene-acrylonitrile (SAN).

The compositions described herein may comprise an ultraviolet (UV) stabilizer for dispersing UV radiation energy. The UV stabilizer does not substantially hinder or prevent cross-linking of the various components of the compositions described herein. UV stabilizers may be hydroxybenzophenones; hydroxyphenyl benzotriazoles; cyanoacrylates; oxanilides; or hydroxyphenyl triazines. Specific UV stabilizers include poly[(6-morphilino-s-triazine-2,4-diyl)[2,2,6,6-tetramethyl-4-piperidyl) imino]-hexamethylene [(2,2,6,6-tetramethyl-4-piperidyl)imino], 2-hydroxy-4-octyloxybenzophenone (Uvinul™ 3008); 6-tert-butyl-2-(5-chloro-2H-benzotriazole-2-yl)-4-methylphenyl (Uvinul™ 3026); 2,4-di-tert-butyl-6-(5-chloro-2H-benzotriazole-2-yl)-phenol (Uvinul™ 3027); 2-(2H-benzotriazole-2-yl)-4,6-di-tert-pentylphenol (Uvinul™ 3028); 2-(2H-benzotriazole-2-yl)-4-(1,1,3,3-tetramethylbutyl)-phenol (Uvinul™ 3029); 1,3-bis[(2'-cyano-3',3'-diphenylacryloyl)oxy]-2,2-bis-{[(2'-cyano-3',3'-diphenylacryloyl)oxy]methyl}-propane (Uvinul™ 3030); 2-(2H-benzotriazole-2-yl)-4-methylphenol (Uvinul™ 3033); 2-(2H-benzotriazole-2-yl)-4,6-bis(1-methyl-1-phenyethyl) phenol (Uvinul™ 3034); ethyl-2-cyano-3,3-diphenylacrylate (Uvinul™ 3035); (2-ethylhexyl)-2-cyano-3,3-diphenylacrylate (Uvinul™ 3039); N,N'-bisformyl-N,N'-bis (2,2,6,6-tetramethyl-4-piperidinyl) hexamethylenediamine (Uvinul™ 4050H); bis-(2,2,6,6-tetramethyl-4-pipieridyl)-sebacate (Uvinul™ 4077H); bis-(1,2,2,6,6-pentamethyl-4-piperdiyl)-sebacate+methyl-(1,2,2,6,6-pentamethyl-4-piperidyl)-sebacate (Uvinul™ 4092H); or combinations thereof. Other UV stabilizers include Cyasorb 5411, Cyasorb UV-3638, Uvinul 3030, and/or Tinuvin 234.

The compositions described herein may comprise heat stabilizers. Exemplary heat stabilizer additives include, for example, organophosphites such as triphenyl phosphite, tris-(2,6-dimethylphenyl)phosphite, tris-(mixed mono-and di-nonylphenyl)phosphite, or the like; phosphonates such as dimethylbenzene phosphonate or the like; phosphates such as trimethyl phosphate, or the like; or combinations thereof.

The compositions described herein may comprise an antistatic agent. Examples of monomeric antistatic agents may include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamines, betaines, or the like, or combinations comprising at least one of the foregoing monomeric antistatic agents.

Exemplary polymeric antistatic agents may include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example PELESTAT™ 6321 (Sanyo) or PEBAX™ MH1657 (Atofina), IRGASTAT™ P18 and P22 (Ciba-Geigy). Other polymeric materials may be used as antistatic agents are inherently conducting polymers such as polyaniline (commercially available as PANIPOL™ EB from Panipol), polypyrrole and polythiophene (commercially available from Bayer), which retain some of their intrinsic conductivity after melt processing at elevated temperatures. Carbon fibers, carbon nanofibers, carbon nanotubes, carbon black, or a combination comprising at least one of the foregoing may be included to render the compositions described herein electrostatically dissipative.

The compositions described herein may comprise a radiation stabilizer, such as a gamma-radiation stabilizer. Exemplary gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-penten-2-ol, and 9 to decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group (—$CH_2OH$) or it can be a member of a more complex hydrocarbon group such as —$CR^{24}HOH$ or —$CR^{24}_2OH$ wherein $R^{24}$ is a complex or a simple hydrocarbon. Specific hydroxy methyl aromatic compounds include benzhydrol, 1,3-benzenedimethanol, benzyl alcohol, 4-benzyloxy benzyl alcohol and benzyl alcohol. 2-Methyl-2,4-pentanediol, polyethylene glycol, and polypropylene glycol are often used for gamma-radiation stabilization.

The term "pigments" means colored particles that are insoluble in the resulting compositions described herein. Exemplary pigments include titanium oxide, carbon black, carbon nanotubes, metal particles, silica, metal oxides, metal sulfides or any other mineral pigment; phthalocyanines, anthraquinones, quinacridones, dioxazines, azo pigments or any other organic pigment, natural pigments (madder, indigo, crimson, cochineal, etc.) and mixtures of pigments. The pigments may represent from 0.05% to 15%, or from about 0.05% to about 15%, by weight relative to the weight of the overall composition.

The term "dye" refers to molecules that are soluble in the compositions described herein and that have the capacity of absorbing part of the visible radiation.

Exemplary fibers that may be used include glass fibers, carbon fibers, polyester fibers, polyamide fibers, aramid fibers, cellulose and nanocellulose fibers or plant fibers (linseed, hemp, sisal, bamboo, etc.) may also be envisaged. It should be understood the that choice of a fiber may depend on the user's needs and other process parameters; the inclusion of fibers is optional and fibers need not be present in all aspects.

Pigments, dyes or fibers capable of absorbing radiation may be used to ensure the heating of an article based on the compositions described herein when heated using a radiation source such as a laser, or by the Joule effect, by induction or by microwaves or any other source of heating. Such heating may allow the use of a process for manufacturing, transforming, or recycling an article made of the compositions described herein.

Suitable fillers for the compositions described herein include: silica, clays, calcium carbonate, carbon black, kaolin, and whiskers. Other possible fillers include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymeric matrix, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents.

Plasticizers, lubricants, and mold release agents can be included. Mold release agent (MRA) will allow the material to be removed quickly and effectively. Mold releases can reduce cycle times, defects, and browning of finished product. There is considerable overlap among these types of materials, which may include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol-A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate (PETS), and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, i.e., methyl stearate and polyethylene-polypropylene glycol copolymer in a suitable solvent; waxes such as beeswax, montan wax, paraffin wax, or the like.

Various types of flame retardants can be utilized as additives. In one aspect, the flame retardant additives include, for example, flame retardant salts such as alkali metal salts of perfluorinated $C_1$-$C_{16}$ alkyl sulfonates such as potassium perfluorobutane sulfonate (Rimar salt), potassium perfluoroctane sulfonate, tetraethylammonium perfluorohexane sulfonate, potassium diphenylsulfone sulfonate (KSS), and the like, sodium benzene sulfonate, sodium toluene sulfonate (NATS) and the like; and salts formed by reacting for example an alkali metal or alkaline earth metal (for example lithium, sodium, potassium, magnesium, calcium and barium salts) and an inorganic acid complex salt, for example, an oxo-anion, such as alkali metal and alkaline-earth metal salts of carbonic acid, such as $Na_2CO_3$, $K_2CO_3$, $MgCO_3$, $CaCO_3$, and $BaCO_3$ or fluoro-anion complex such as $Li_3AlF_6$, $BaSiF_6$, $KBF_4$, $K_3AlF_6$, $KAlF_4$, $K_2SiF_6$, and/or $Na_3AlF_6$ or the like. Rimar salt and KSS and NATS, alone or in combination with other flame retardants, are particularly useful in the compositions disclosed herein. In certain aspects, the flame retardant does not contain bromine or chlorine.

The flame retardant additives may include organic compounds that include phosphorus, bromine, and/or chlorine. In certain aspects, the flame retardant is not a bromine or chlorine containing composition. Non-brominated and non-chlorinated phosphorus-containing flame retardants can include, for example, organic phosphates and organic compounds containing phosphorus-nitrogen bonds. Exemplary di- or polyfunctional aromatic phosphorus-containing compounds include resorcinol tetraphenyl diphosphate (RDP), the bis(diphenyl) phosphate of hydroquinone and the bis (diphenyl) phosphate of bisphenol-A, respectively, their oligomeric and polymeric counterparts, and the like. Other exemplary phosphorus-containing flame retardant additives include phosphonitrilic chloride, phosphorus ester amides, phosphoric acid amides, phosphonic acid amides, phosphinic acid amides, tris(aziridinyl) phosphine oxide, polyorganophosphazenes, and polyorganophosphonates.

Some suitable polymeric or oligomeric flame retardants include: 2,2-bis-(3,5-dichlorophenyl)-propane; bis-(2-chlorophenyl)-methane; bis(2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; 2,2-bis-(3,5-dichloro-4-hydroxyphenyl)-propane; and 2,2-bis-(3-bromo-4-hydroxyphenyl)-propane. Other flame retardants include: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

The flame retardant optionally is a non-halogen based metal salt, e.g., of a monomeric or polymeric aromatic sulfonate or mixture thereof. The metal salt is, for example, an alkali metal or alkali earth metal salt or mixed metal salt. The metals of these groups include sodium, lithium, potassium, rubidium, cesium, beryllium, magnesium, calcium, strontium, francium and barium. Examples of flame retardants include cesium benzenesulfonate and cesium p-toluenesulfonate. See e.g., U.S. Pat. No. 3,933,734, EP 2103654, and US2010/0069543A1, the disclosures of which are incorporated herein by reference in their entirety.

Another useful class of flame retardant is the class of cyclic siloxanes having the general formula $[(R)_2SiO]_y$, wherein R is a monovalent hydrocarbon or fluorinated hydrocarbon having from 1 to 18 carbon atoms and y is a number from 3 to 12. Examples of fluorinated hydrocarbon include, but are not limited to, 3-fluoropropyl, 3,3,3-trifluoropropyl, 5,5,5,4,4,3,3-heptafluoropentyl, fluorophenyl, difluorophenyl and trifluorotolyl. Examples of suitable cyclic siloxanes include, but are not limited to, octamethylcyclotetrasiloxane, 1,2,3,4-tetramethyl-1,2,3,4-tetravinylcyclotetrasiloxane, 1,2,3,4-tetramethyl-1,2,3,4-tetraphenylcyclotetrasiloxane, octaethylcyclotetrasiloxane, octapropylcyclotetrasiloxane, octabutylcyclotetrasiloxane, decamethylcyclopentasiloxane, dodecamethylcyclohexasiloxane, tetradecamethylcycloheptasiloxane, hexadecamethylcyclooctasiloxane, eicosamethylcyclodecasiloxane, octaphenylcyclotetrasiloxane, and the like. A particularly useful cyclic siloxane is octaphenylcyclotetrasiloxane.

Exemplary antioxidant additives include organophosphites such as tris(nonyl phenyl)phosphite, tris(2,4-di-t-butylphenyl)phosphite ("IRGAFOS 168" or "I-168"), bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene(3,5-di-tert-butyl-4-hydroxyhydrocinnamate)] methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate or the like; amides of beta-(3,5-di-tert-butyl-4- hydroxyphenyl)-propionic acid or the like, or combinations comprising at least one of the foregoing antioxidants.

As described, the disclosed compositions may include PTFE, which has anti-drip properties. The disclosed compositions may include additional anti-drip agent, depending on the user's needs.

Although filler and rubbery impact modifiers generally improve rheological performance of many crystalline and amorphous polymers, the balance of properties and surface aesthetics may not be favorable to many applications. Fibrillation of PTFE results during compounding and can influence mechanical properties and rheological response of the blends. The effects of in situ PTFE fibrillation may be favorable on the rheological response of semi-crystalline (such as: PBT, PP, PCL, PE, PET, PA, PTT, PEN, PBN) and amorphous polymers (such as: PC, PC-co polymers, PPO) and their blends (such as: PC/PBT, PC/PET, PCL/PE) for applications like additive manufacturing, electrical and thermal property enhancements, mechanical property enhancement of uniaxial and biaxial stretched tapes, cell stability in foams, pipe extrusion, and the like.

In some aspects of the presently disclosed dies, the dies may comprise four regions—an entrance section, an elongation or orientation section, a merging region, and an exit region. Each of these sections contributes to the elongation/orientation (e.g., fibrillation) of the materials fed to the dies.

Entrance Section:

An entrance section may include one or more inlets to the die. An inlet may give rise to a contracted flow, which may be created by a contracting flow channel at the entrance, if present.

Orientation Section:

In an orientation section, fluid is oriented in channels (orientation channels) having an elongation ratio of greater than 1, e.g., 4. (The elongation ratio of a channel is the ratio of the cross-sectional area of the channel inlet to the cross-sectional area of the channel outlet). The shapes of the inlet and outlet of a channel in the orientation section may be circular, though this is not a requirement, as the inlet and outlet may be, independently, circular, oblong, polygonal, or otherwise shaped.

Merging Region:

In this die section, oriented flows from the orientation section are merged before being communication to the exit section.

Exit Region:

the merged fibers within the material exit the die under shear flow. An exit region may have a tapered rectangular section so as to form a tape or other cross-section of output. The exit section may include one or more orientation channels, and the exit region may action as an orientation section apply further elongation/orientation force to the material being processed. The disclosed dies may be contrasted with existing die designs in a variety of ways, e.g., that existing die designs that are fitted at the end of extruders do not have a feature creating strong extensional flow field, they only have a shear flow field.

By "oriented" is meant an element sharing an alignment (or nearly sharing an alignment) with another element. As one example, an element (e.g., a fibril) may have a major axis that is within about, e.g., 20 degrees of parallel to the corresponding major axis of another fibril. As another example, a region may comprise a plurality of oriented fibrils, the fibrils all having major axes that are aligned to within about 20 degrees of a particular line in space.

Exemplary Aspects

FIG. 1 provides a view of an exemplary die 100 according to the present disclosure. The die 100 may include an entrance section 101, which entrance section comprises a hemispherical profile 103. Within die 100 is a merging region 103 and an exit region 107. As described elsewhere herein, the merging region may be configured so as to give rise to extensional or orientation flow in the direction of downward flow through the die (e.g., flow downward from the entrance section 101, into merging region 103, and then into exit region 107 in a vertical direction) as well as extensional or orientation flow that is at least partially transverse to that downward direction.

Figure 2:
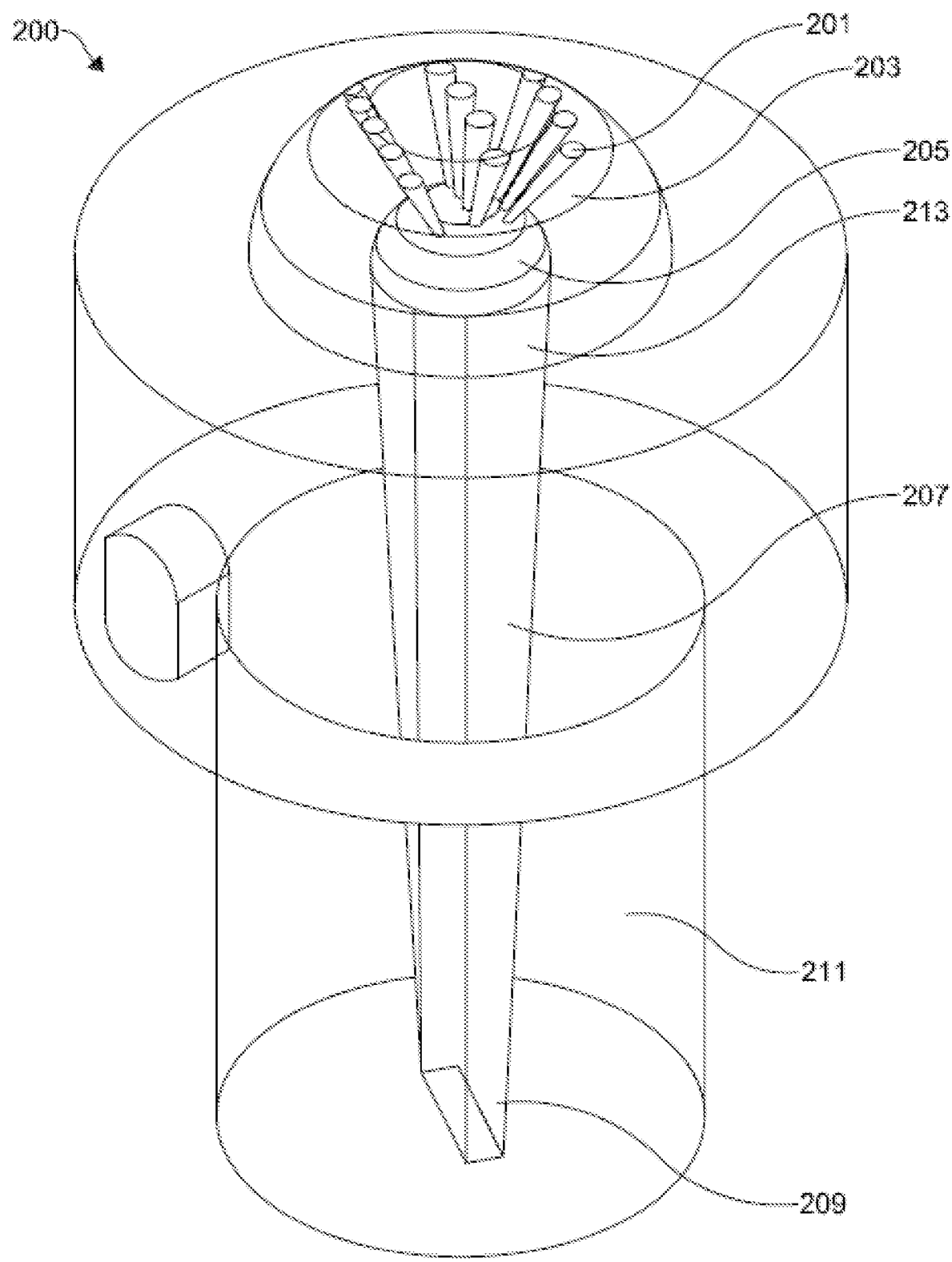
FIG. 2 provides a cutaway view of the die of FIG. 1.

FIG. 2 provides a cutaway view of die 200. As shown, the die 200 includes orientation channels 203. An orientation channel may include an inlet 201. The orientation channels 203 may terminate at merging region 205. The merging region 205 may define a spherical receiving region. The die 200 may include an exit region 211. Exit region 211 may include an entrance 213 and a tapered region 207. Entrance 213 may interface directly with the merging region 205. Exit region 211 may include an exit 209. Exit 209 may be of a variety of cross-sections, e.g., rectangular.

Orientation channels, merging regions, and exit regions may include smooth walls, but may also comprise walls that are ridged, stubbled, studded, or otherwise not smooth. Such surface features of the various stages of the die may give rise to flow fields that provide additional extensional or orientational flow.

Figure 3:
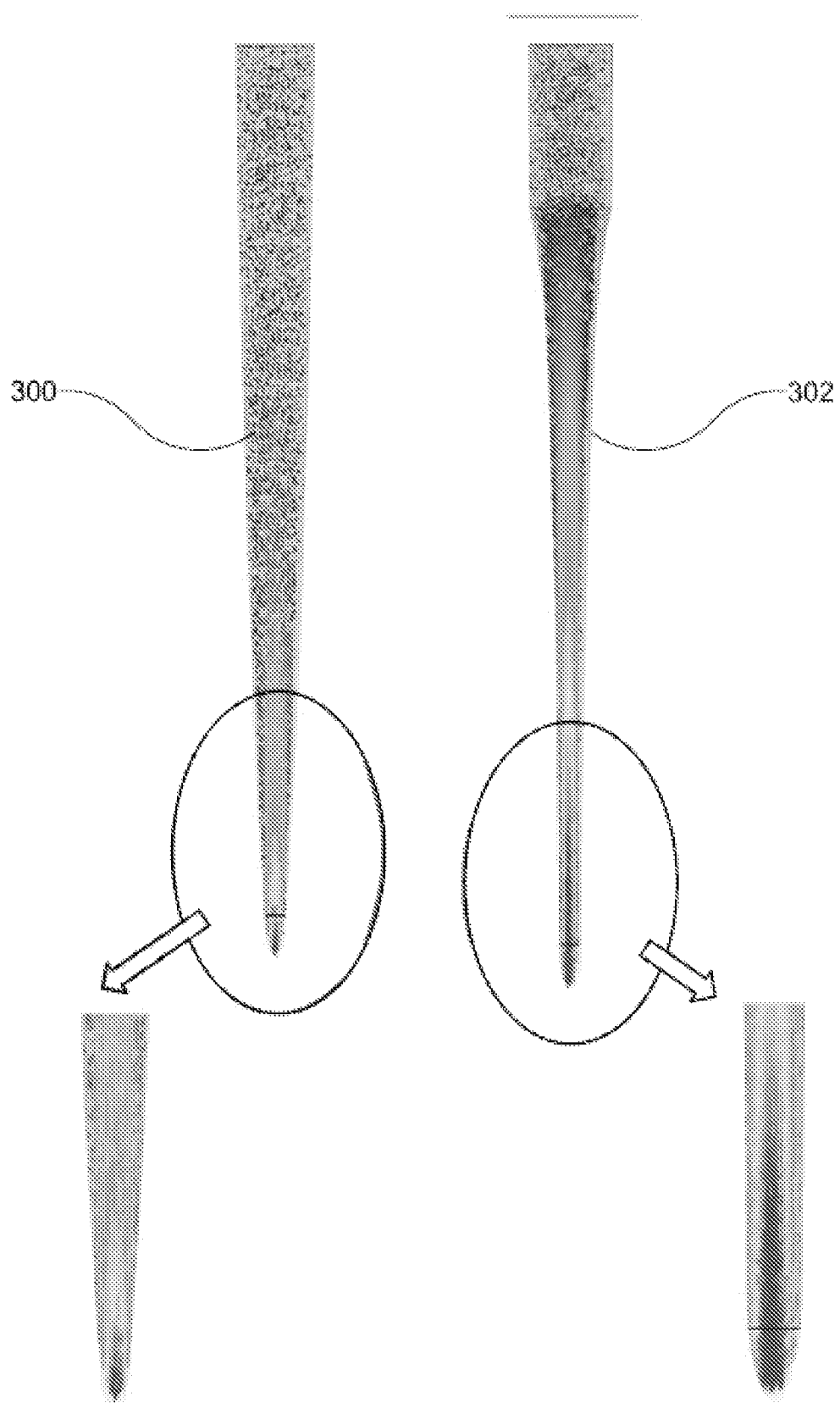
FIG. 3 provides exemplary velocity profiles of an orientation channel according to existing technologies (left) and an orientation channel having a flow profile with a hyperbolic geometry and according to the present disclosure (right)

FIG. 3 provides views of an orientation channel according to existing technologies 300 and an orientation channel 302 according to the present disclosure. Standard orientation channel 300 includes a linearly tapering cross-section. Disclosed orientation channel 302 includes a flow profile with a hyperbolic geometry. FIG. 3 provides a flow velocity map; as shown in the figure, higher velocity flow is shown by darker color. Disclosed orientation channel provides a higher flow velocity, which higher flow velocity gives rise to the orientation of the matrix polymer and any reinforcements present in the matrix polymer. (Without being bound to any particular theory, increased wall stress may also contribute to the orientation.)

Figure 4:
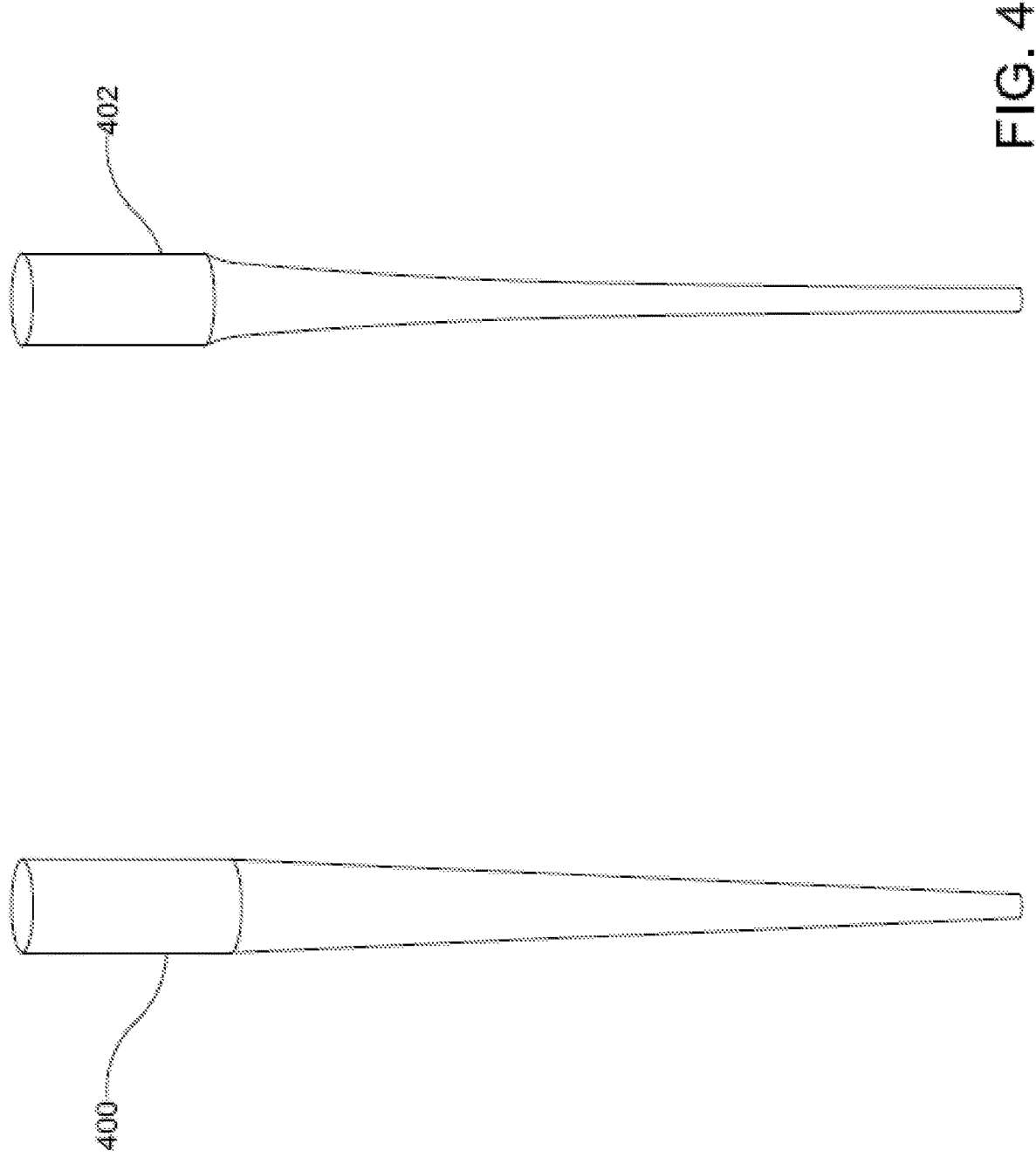
FIG. 4 provides exterior views of the two orientation channels shown in FIG. 3.

FIG. 4 provides an orientation channel 400 according to existing technologies and also an orientation channel 402 according to the present disclosure, which are exterior views of the channels shown in FIG. 3. As shown in FIG. 4, the disclosed technology channel 402 includes a hyperbolic entrance.

Figure 5:
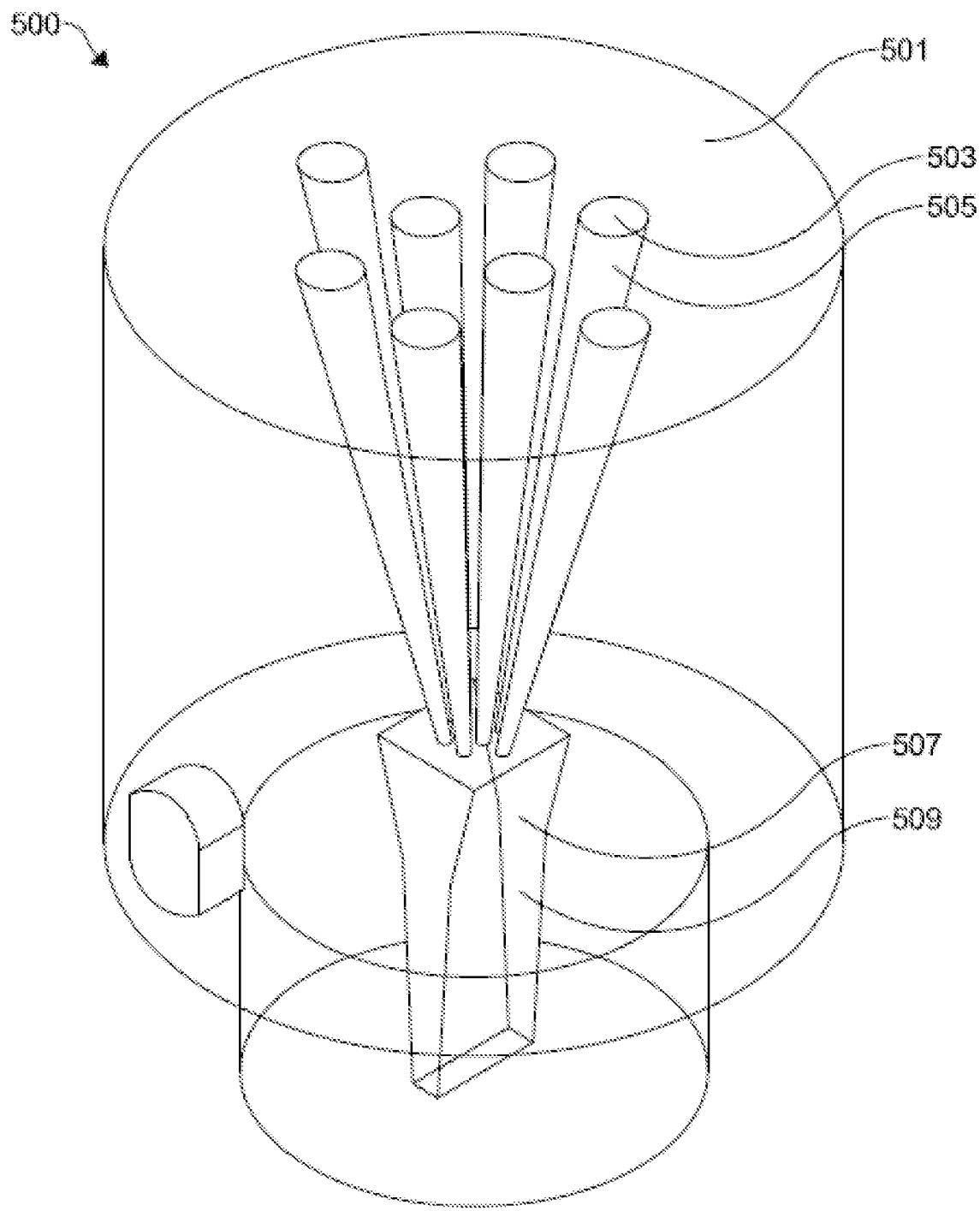
FIG. 5 provides a cutaway view of an exemplary die according to the present disclosure.

FIG. 5 provides an exemplary die 500 according to the present disclosure. The die 500 includes an upper face 501, in which face are formed various orientation channels 505, the orientation channels having inlets 503. The orientation channels 505 converge at merging region 507. The merging region 507 has an outlet to an exit region, which outlet 509 may have a tapered cross-sectional dimension. As shown in FIG. 5, the orientation channels 505 may converge at a single point in space, which point is within the merging region 507 of the die 500.

Figure 6:
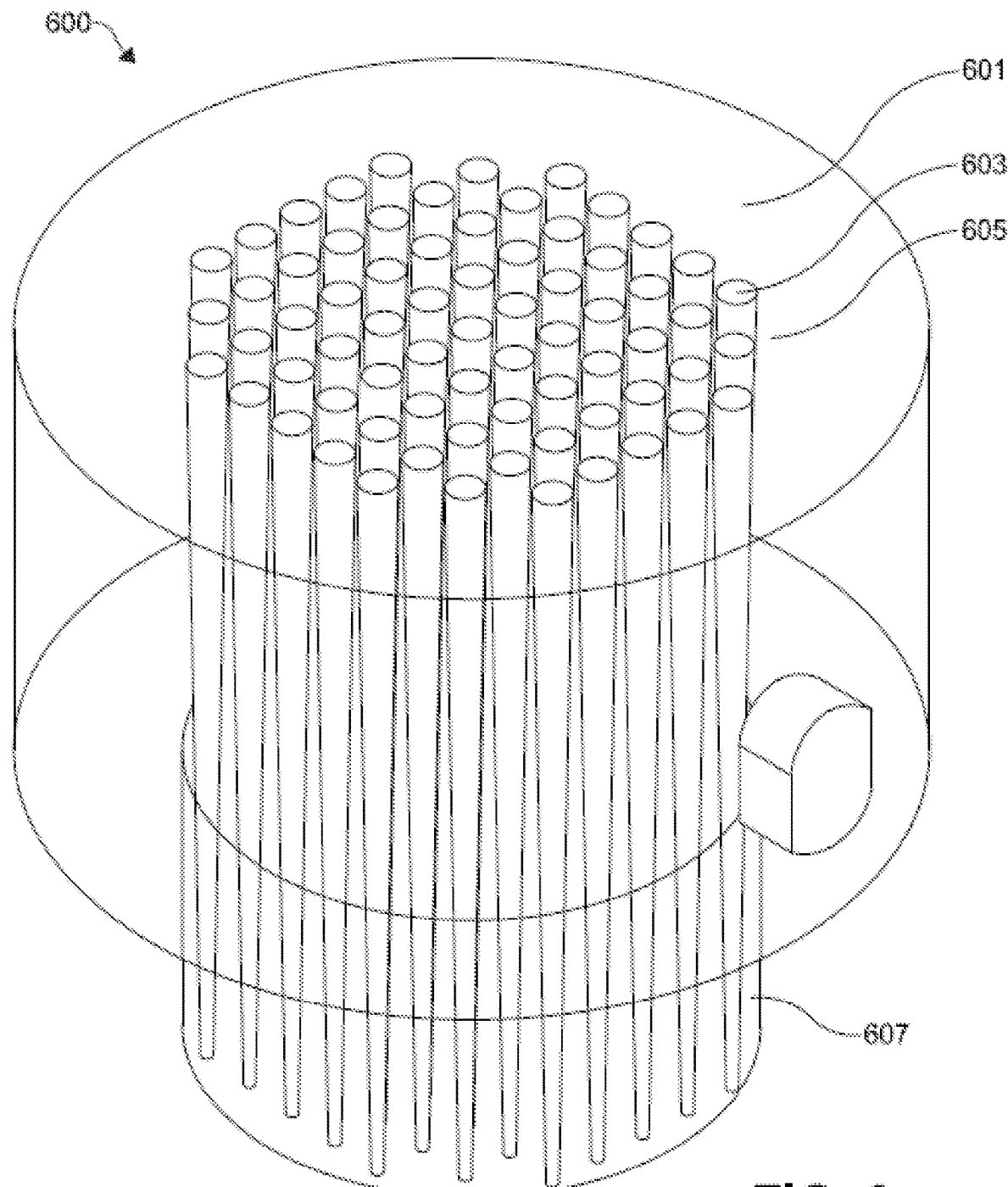
FIG. 6 provides a cutaway view of an exemplary die according to the present disclosure.

FIG. 6 provides an alternative die 600 according to the present disclosure. Die 600 includes an upper face 601, within which face are formed orientation channels 605 having inlets 603. The orientation channels in this aspect are parallel to one another and have outlets 607. The exit region is not shown.

Figure 7:
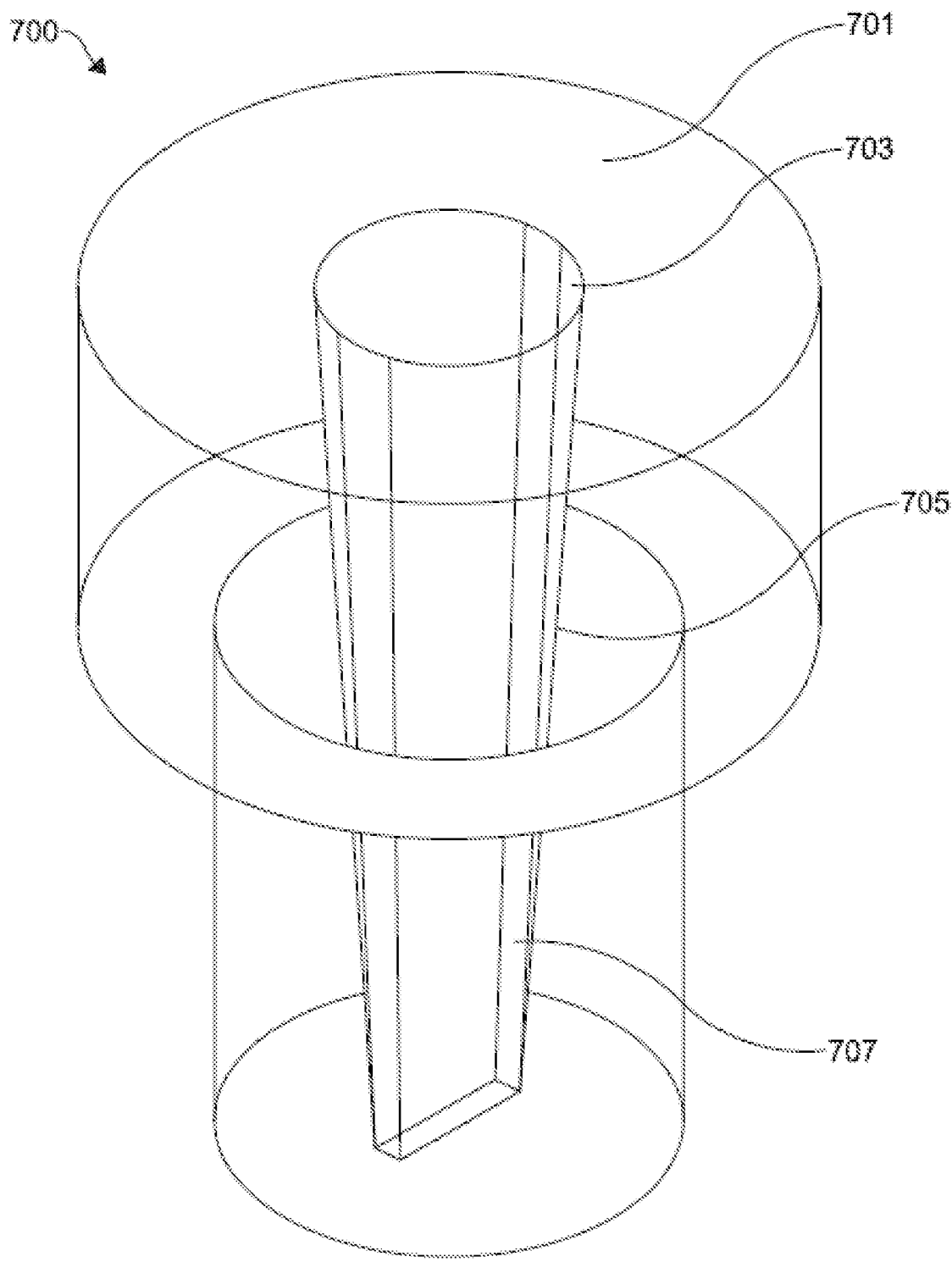
FIG. 7 provides a cutaway view of an exemplary die according to the present disclosure.

FIG. 7 provides a die 700 according to the present disclosure. Die 700 has an upper face 701 and an inlet 703 formed in the upper face 701. The inlet 703 leads to a tapered, rectangular channel 705. Channel 705 tapers to a rectangular outlet 707.

Figure 8:
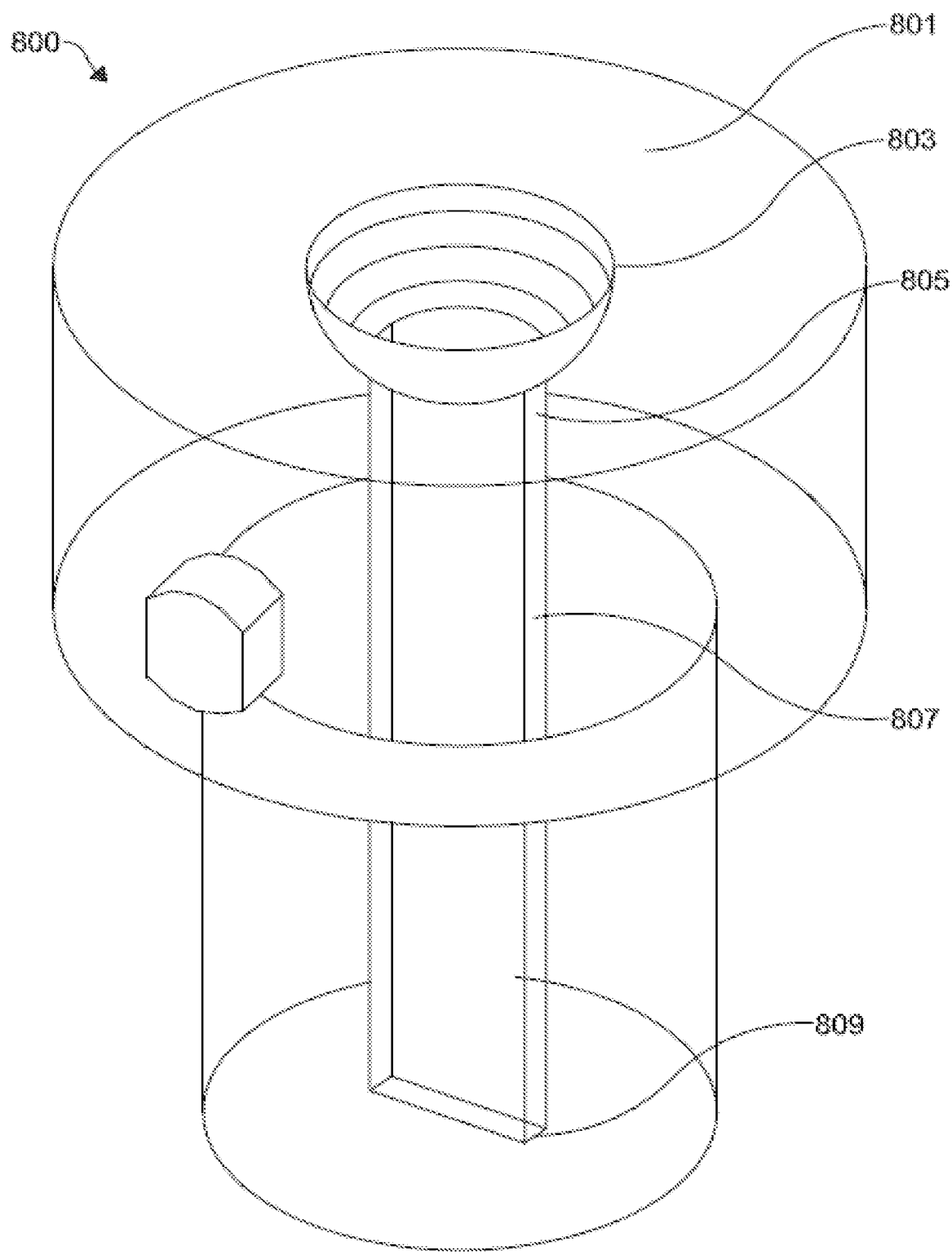
FIG. 8 provides a cutaway view of an exemplary die according to the present disclosure.

FIG. 8 provides a die 800 according to the present disclosure. Die 800 has an upper face 801 and an inlet 803 formed in the upper face 801; the inlet 803 leads to a hemispherical entrance volume 805. In fluid communication with entrance volume 805 is a channel 807 having a rectangular cross section and an outlet 809.

Figure 9:
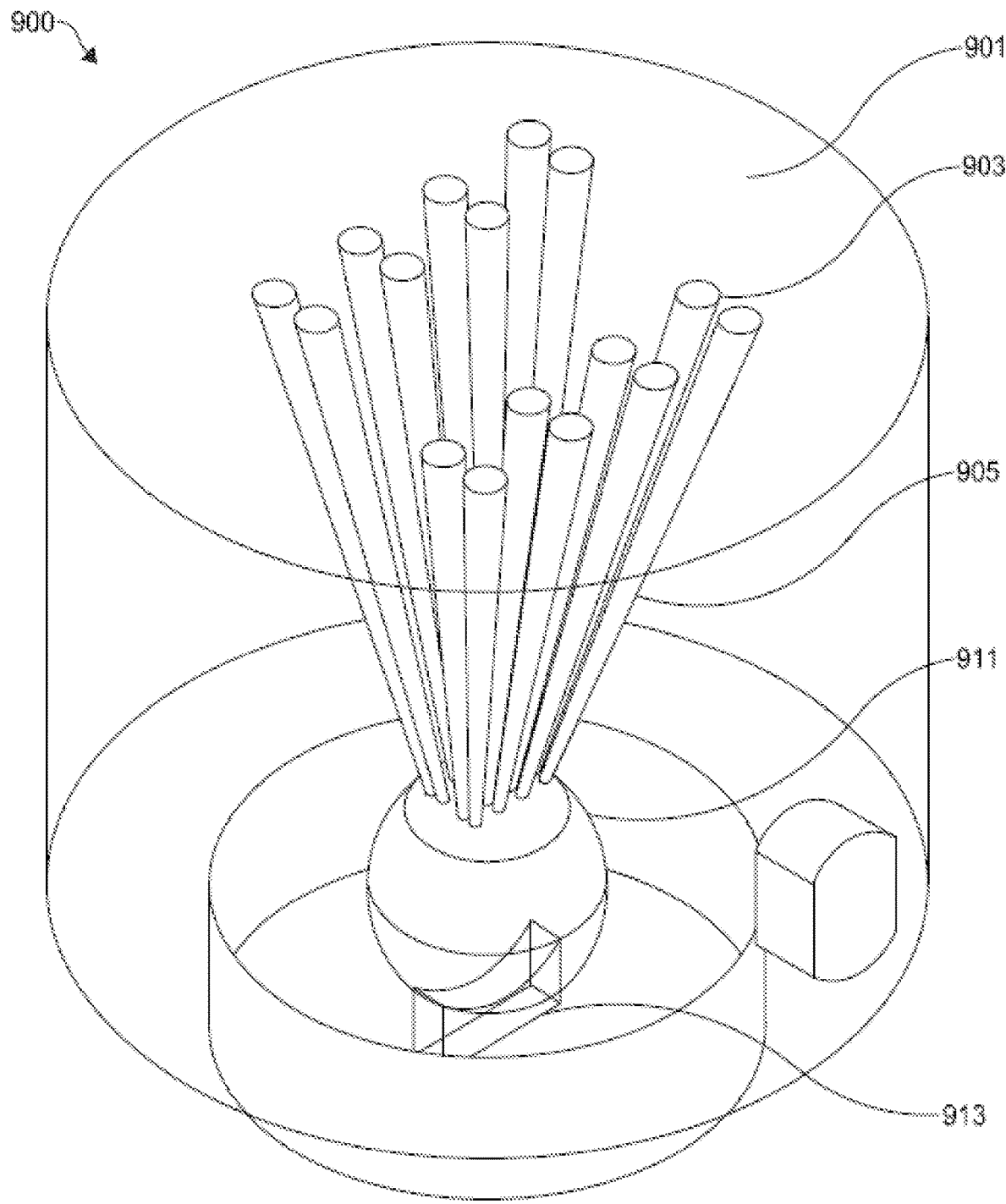
FIG. 9 provides a cutaway view of an exemplary die according to the present disclosure.

FIG. 9 provides an exemplary die 900 according to the present disclosure. The die 900 includes an upper face 901, in which face are formed various orientation channels 905, the orientation channels having inlets 903. The orientation channels 905 converge at merging region 911. The merging region 911 has a spherical receiving volume and an outlet to an exit region 913.

As shown, the orientation channels 905 may be arranged in rows (regular or irregular). The orientation channels need not converge to a single point in space; as shown in FIG. 9, the orientation channels may be arranged in such a way that the channels are arranged in rows but do not converge at a single point.

Figure 14:
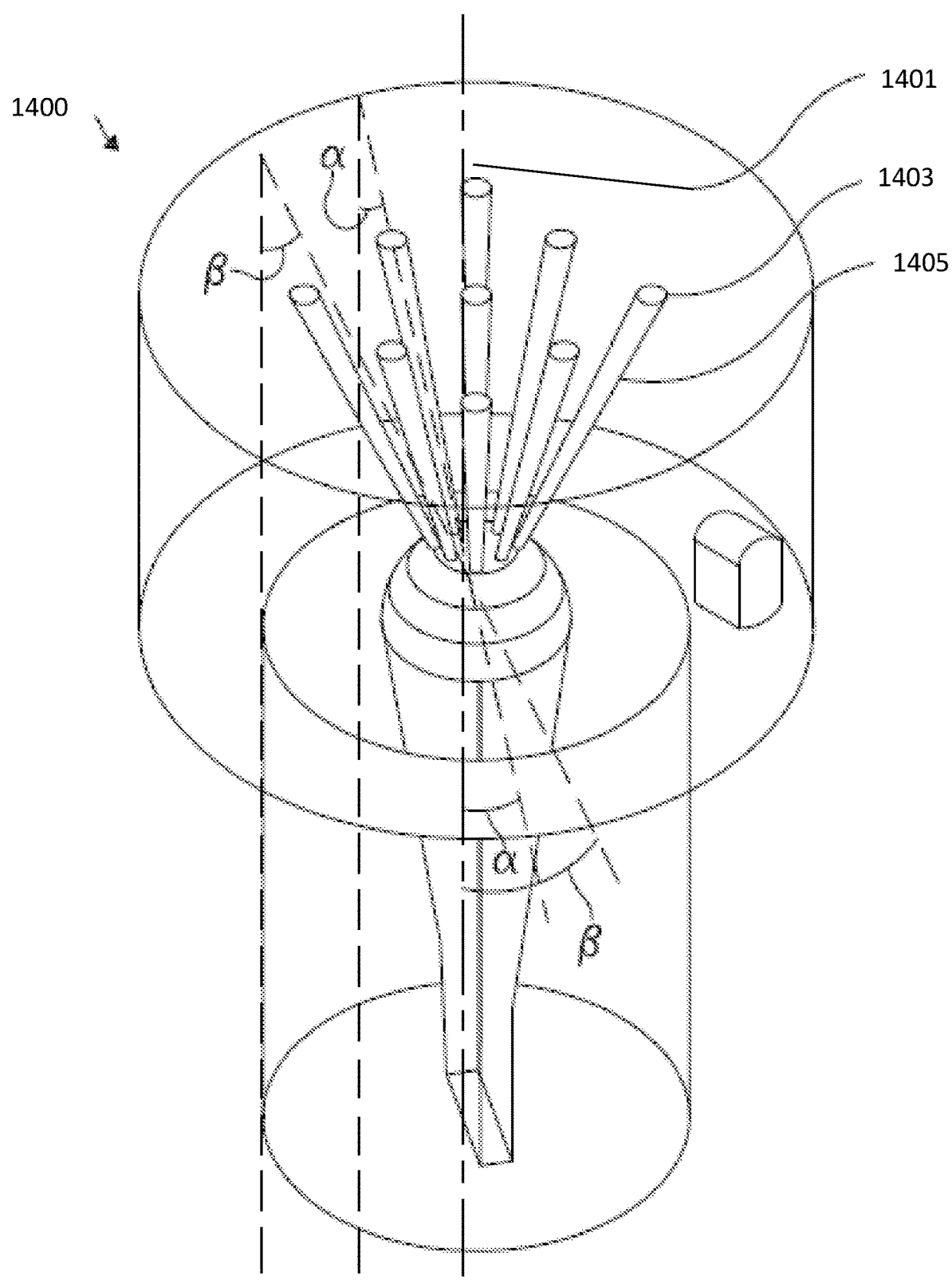
FIG. 14 provides an annotated, cutaway view of an exemplary die according to the present disclosure.

FIG. 14 provides an exemplary die 1400 according to the present disclosure. (FIG. 14 provides an annotated version of FIG. 11.) Die 1400 includes orientation channels 1403 and 1405. As shown in FIG. 14, channel 1403 is at an angle α from a vertical line, and channel 1405 is at an angle β from a vertical line. Angles α and β may be the same, but may also differ from one another. In this way, streams of matrix material having fibrillated reinforcement material may converge at different angles to one another (as shown by angles α and β), this giving rise to fibers having fibrils within, the fibrils within being oriented at different angles to one another. In some aspects, a fiber may include a first set of fibrils oriented together at one angle and a second set of fibrils oriented together and at another angle that differs from the orientation angle of the first set of fibrils. (Further discussion is provided elsewhere herein.)

The angles of orientation of each orientation channel may vary between, e.g., 0-60 degrees measured from a major vertical axis that passes through or parallel to the exit channel. As shown in the figure, an orientation channel parallel to the exit channel (broken-line) is 0 degrees to the vertical axis. Whereas the next nearest orientation channel is oriented at an angle α with respect to a major vertical axis and the farthest orientation channel is oriented at an angle of β relative to a major vertical axis, where β>α. In some aspects, 60>β>α≥0 degrees.

Accordingly, a die may include two or more channels that are inclined at different angles from one another, as there is no requirement that orientation channels all converge at the same location. Orientation channels may be arranged in a skew arrangement or even be arranged in a skew-symmetric arrangement.

Figure 10:
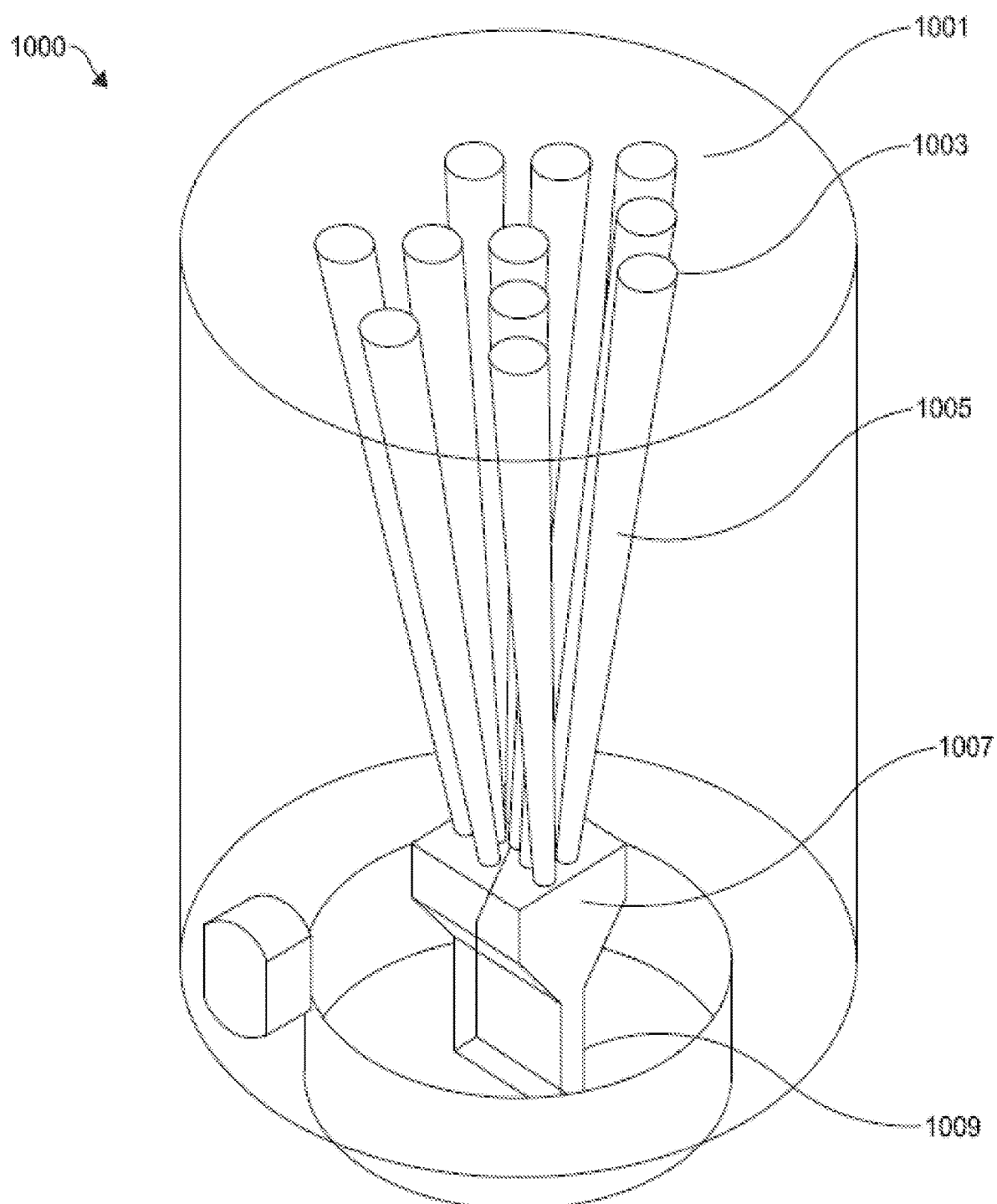
FIG. 10 provides a cutaway view of an exemplary die according to the present disclosure.

FIG. 10 provides an exemplary die 1000 according to the present disclosure. The die 1000 includes an upper face 1001, in which face are formed various orientation channels 1005, the orientation channels having inlets 1003. The orientation channels 1005 converge at merging region 1017. The merging region 1007 has a polygonal receiving volume and an outlet to an exit region 1009. As shown, the orientation channels 1005 may be arranged in an irregular pattern in which the orientation channels the orientation channels may be arranged in such a way that the channels are arranged in rows but do not converge at a single point.

Figure 11:
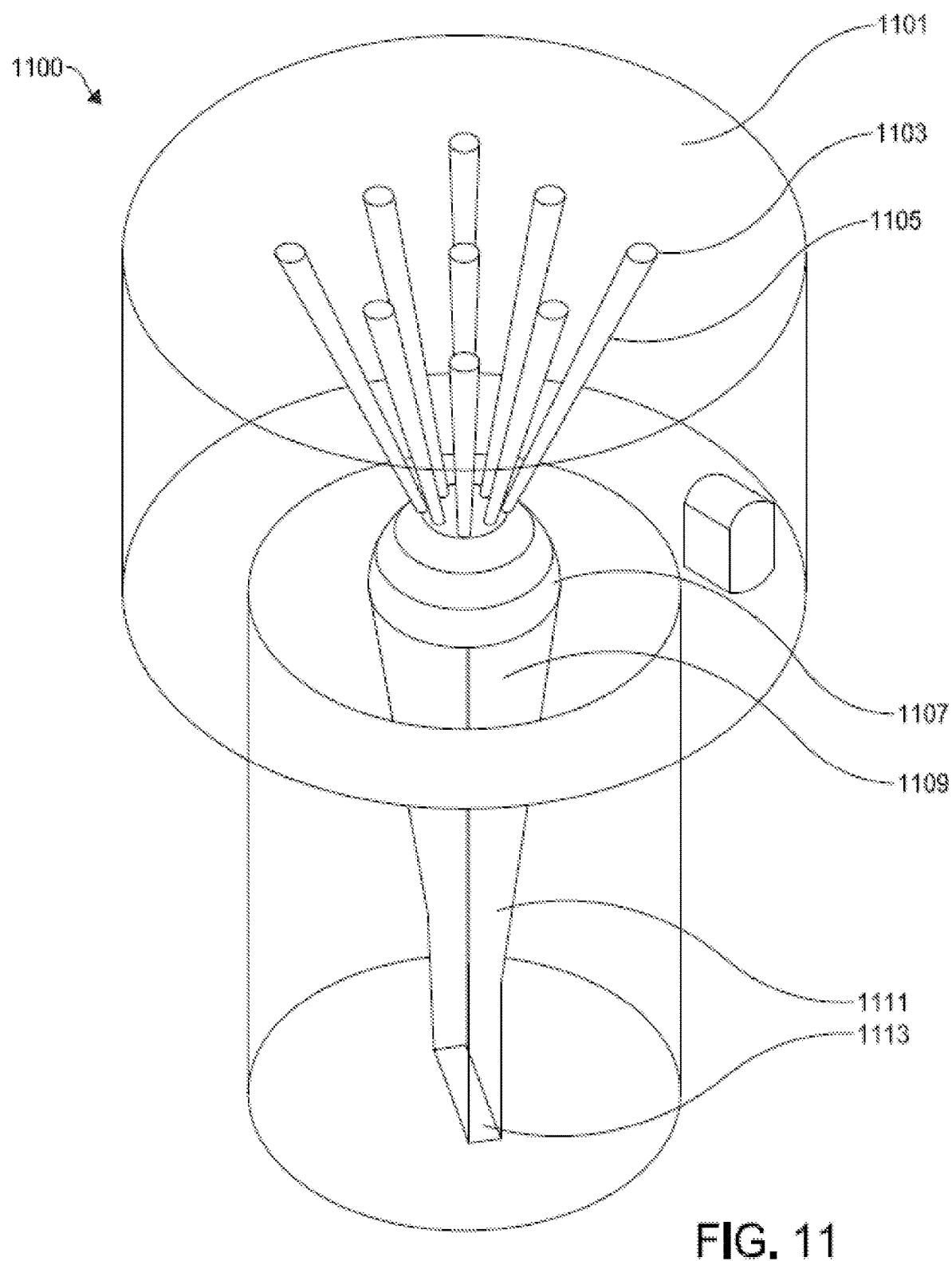
FIG. 11 provides a cutaway view of an exemplary die according to the present disclosure.

FIG. 11 provides an exemplary die 1100 according to the present disclosure. The die 1100 includes an upper face 1101, in which face are formed various orientation channels 1105, the orientation channels having inlets 1103. The orientation channels 1105 converge at merging region 1107. The merging region 1107 has a hemispherical receiving volume and an outlet to an exit region 1109. The exit region may taper 1111 to an exit 1113.

Figure 15:
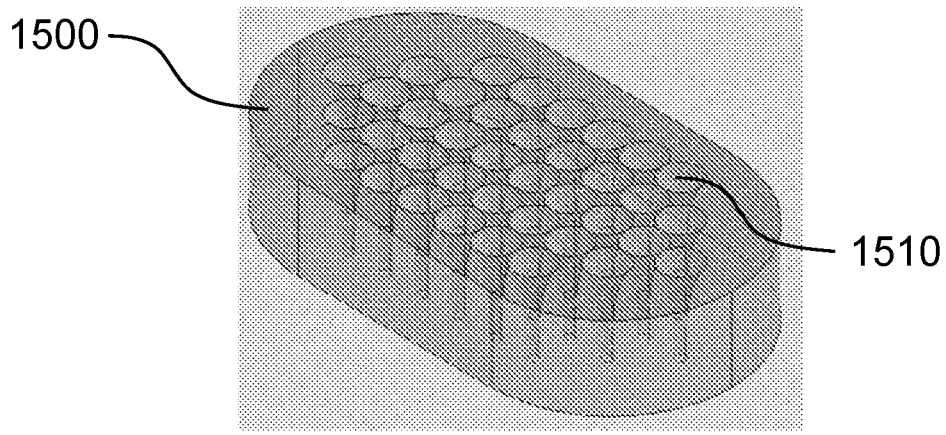
FIG. 15 shows an exemplary die that may be used in combination with a die holder according to the present disclosure.

FIG. 15 provides an exemplary scaled-up die 1500 including a plurality of orientation channels 1510. The die 1500 allows for inclusion of different configurations of orientation channels such as those described in the dies herein, and may further be used in combination with a die holder as described below.

It should be understood that an orientation channel may be straight and also axisymmetric, but may also be curved, angled, or otherwise asymmetric about one, two, or three axes. A merging region may be symmetric, but this is not a requirement, as a merging region may be oblong, skewed, or otherwise asymmetric about one, two, or three axes. Likewise, an exit region may be symmetric, but may also be asymmetric about one, two, or three axes.

Further Aspects

The following aspects are illustrative only, and do not serve to limit the scope of the present disclosure.

Aspect 1. A die, comprising, consisting of, or consisting essentially of: an entrance section comprising at least one inlet; the inlet being in fluid communication with an orientation section of the die, the orientation section comprising a plurality of orientation channels having an inlet and an outlet, at least some of the plurality of orientation channels independently having an elongation ratio of between about 2 and about 45, the elongation ratio being defined as the ratio of the cross-sectional area of the channel inlet to the cross-sectional area of the channel outlet; a merging region, the merging region defining a receiving volume in fluid communication with the outlets of the plurality of orientation channels of the orientation section, the merging region being configured to merge together at least some fluid flows originating from the outlets of the orientation channels of the orientation section; and an exit region in fluid communication with the merging region, the exit region comprising at least one outlet.

Dies according to the present disclosure may be formed of metals, metal alloys, ceramics, polymers, and the like. Dies may be formed by, for example, additive manufacturing processes, casting processes, molding processes, and the like.

An entrance section may have one, two, three, four, or more outlets. The entrance section may be planar, hemispherical, hemi-cylindrical or otherwise shaped. Hemispherical entrance sections are considered particularly suitable, but are not required.

As explained, an orientation channel may have an elongation ratio of the cross-sectional area of the channel inlet to the cross-sectional area of the channel outlet of between about 2 and about 45, e.g., a ratio of between about 2 and about 45, between about 5 and about 40, between 10 and about 35, between 15 and about 30, or between 20 and about 25. Elongation ratios of 2, 3, 4, 5, 6, 7, 8, 9, 10, 11, 12, 13, 14, 15, 16, 17, 18, 19, 20, 21, 22, 2, 24, 25, 26, 27, 28, 29, 30, 31, 32, 33, 34, 35, 36, 37, 38, 39, 40, 41, 42, 43, 44, and 45 are all considered suitable.

Aspect 2. The die of aspect 1, wherein at least some of the plurality of orientation channels are configured to induce a flow profile with a parabolic geometry, a plug flow, a flow profile with a hyperbolic geometry, or any combination thereof, on material flowing within the at least some plurality of orientation channels. One exemplary flow profile is shown in FIG. 3, which figure is described elsewhere herein.

An orientation channel—without being bound to any particular theory—may be circular in cross-section. An orientation channel may have an oval, oblong, or polygonal cross-sectional profile. As described elsewhere herein, an orientation channel may have a varying cross-section along the orientation channel's length. An orientation channel may be conical in configuration, and may also be frustoconical (truncated cone) in configuration. An orientation channel may be straight, curved, or may even comprise a straight region and a curved region.

An orientation channel in a system may be configured to, during operation, impose accumulated strain of, e.g., about 3 to about 4 units over the length of the channel. An orientation channel in a system may also be configured to impose a Hencky strain over the length of the channel of from about 2 to about 8 units, e.g., 2, 2.5, 3, 3.5, 4, 4.5, 5, 5.5, 6, 6.5, 7, 7.5, or even about 8. The foregoing strain levels are not a requirement, but—and without being bound to any particular theory—the foregoing strain levels may give rise to suitable orientation of reinforcement materials disposed within the composition being processed by the die.

Flow profiles with a hyperbolic geometry are considered especially suitable, as they confer a comparatively strong flow profile within an orientation channel. The angle of curvature of the entrance of a hyperbolic-configured channel may vary from 120-150 degrees, where the angle is the angle between a horizontal axis and a line tangent to the hyperbola at the entrance.

The hyperbolic entrance may have a hyperbolic curvature over about 1 to about 95% of the length of the orientation channel, e.g., from 1, to 95%, from 5 to 90%, from 10 to 85%, from 15 to 80%, from 15 to 75%, from 20 to 70%, from 25 to 65%, from 30 to 60%, from 35 to 55%, from 40 to 50%, or even about 45%. An orientation channel may include a hyperbolic-shaped region and a linearly- or otherwise tapered region. The diameter of the orientation channel may decrease by from about 1 to about 95% over the length of the hyperbolic or parabolic-shaped region of the orientation channel.

Without being bound to any particular theory, an orientation channel may be configured (i.e., shaped) to impose a particular velocity profile (or wall stress, or both) on fluid that is communicated through the channel in the direction of the merging region. Without being bound to any particular theory, the velocity profile and/or stress act to orient the polymer chains of any polymeric matrix material fed through the die as well as orient reinforcement material that may be present in the feed of matrix material.

Aspect 3. The die of any of aspects 1-2, wherein at least some of the plurality of orientation channels independently have a length in the range of from about 4 to about 50 mm. Not all orientation channels must be of the same length; in some aspects, one group of channels are of the same length, while other channels differ in length from that group of channels. A die may be constructed such that every orientation channel is of a different length.

Aspect 4. The die of any of aspects 1-3, wherein at least two of the orientation channels converge. In some aspects, all of the orientation channels converge. As one example, in an aspect that comprises two straight channels, lines drawn from the centers of the outlets of those two straight channels may converge. In another aspect comprising a plurality of straight orientation channels, lines extending from the centers of the outlets of fewer than all of the orientation channels converge.

Aspect 5. The die of any of aspects 1-4, wherein the outlets of the plurality of orientation channels are regularly spaced about one another at the merging region. In some aspects, the outlets of the plurality of the orientation of channels are arranged in periodic pattern relative to one another.

Aspect 6. The die of any of aspects 1-3, at least two of the orientation channels do not converge. In such an arrangement, flows originating from the outlets of the at least two orientation channels may not be opposed to one another. As one example, the outlets of the at least two orientation channels may be arranged such that they are not opposed, e.g., such that flows emanating from the outlets of the channels are parallel to one another or diverge from one another.

Aspect 7. The die of any of aspects 1-6, wherein at least some of the orientation channels are arranged in a skew symmetric pattern.

Aspect 8. The die of any of aspects 1-7, wherein the merging region defines an at least partially spherical receiving volume. The merging region may define a hemispherical receiving volume, in some aspects.

Aspect 9. The die of any of aspects 1-8, wherein the merging region defines an at least partially polygonal receiving volume.

Aspect 10. The die of any of aspects 1-9, wherein the merging region is shaped so as to orient reinforcement agents (e.g., PTFE, UHMW-PE) in a flow direction originating from orientation channels into the merging region along the flow direction and in a direction transverse to the flow direction.

The merging region may be shaped so as to orient reinforcement agents in a flow direction originating from orientation channels into the merging region along the flow direction. In some aspects, the merging region is shaped so as to orient reinforcement agents in a flow direction originating from orientation channels into the merging region along a direction within about 45 degrees (or less) relative to the flow direction, e.g., within about 45, about 40, about 35, about 30, about 25, about 20, about 15, about 10, or even within about 5 degrees from the flow direction. The merging region may be shaped such that the merging region converges two or more flows originating from orientation channels.

The merging region and orientation channels may be arranged such that the merging region gives rise to multiple parallel flows. The merging region and orientation channels may be arranged such that the merging region gives rise to countercurrent flows that originate from the orientation channels. The merging region and orientation channels may be arranged such that the merging region gives rise to co-current flows that originate from the orientation channels. Again without being bound by any particular theory, the orientation section of a die may act to create a comparatively strong orientational flow, following by further drawing (i.e., orientation) of the molecular structures of molecules in the material fed to the die, before the oriented molecules exit the die.

The merging region may be configured such that the merging region receives matrix and reinforcement materials from the orientation channels and gives rise to a flow pattern that orients the materials in two or more directions. The merging region may give rise to a first set of oriented materials that are oriented at a direction that is different (e.g., by 10, 20, 30, 40, 50, 60, or even 70, 80, or 90 degrees) from the alignment of a second set of oriented materials.

Aspect 11. The die of any of aspects 1-10, wherein the receiving volume defines a cross-sectional dimension that contracts in the direction of the exit region. One such example is shown in FIG. 10, wherein the merging region 1007 tapers in the direction of the exit from the die.

Aspect 12. The die of any of aspects 1-11, wherein the outlet of the exit region defines a rectangular cross section, an at least partially circular cross-section, or a polygonal cross section. A cross-section that includes a side and a curve (e.g., a semi-circular cross-section) is suitable. The aspect ratio of a rectangular outlet may be, e.g., from 1 to about 20, e.g., from 2 to 19, from 3 to 18, from 4, to 17, from 5 to 16, from 6 to 15, from 7 to 14, from 8 to 14, from 9 to 13, from 10 to 12, or even about 11. An outlet may be triangular, quadrilateral, pentagonal, or otherwise polygonally-shaped.

Aspect 13. The die of any of aspects 11-13, wherein the exit region further defines a channel having a varying cross-section. One such example is provided by FIG. 11, which FIG. provides an exit region 1111 having a tapered (varying) cross-section.

The ratio of the cross-section of the exit region to the cross-section of an orientation channel may be in the range of 1:1000 to 1000:1, e.g., 1:500 to 500:1, 1:100 to 100:1, 1:50 to 50:1, 1:25 to 25:1, or even 1:10 to 10:1. The outlet of an orientation channel may be circular, but may also be oval or even polygonal in shape. Similarly, an inlet to the exit region (which may be an aperture formed in the merging region) may be circular, but may also be polygonal or oval in shape.

Aspect 14. An extruder, the extruder being in fluid communication with a die according to any of aspects 1-13. An extruder may include a loading region configured to receive a feed material, the loading region being in fluid communication with a die according to the present disclosure. The extruder can function to apply pressure and/or heat to the feed material to soften/melt the feed material.

Figure 16A:
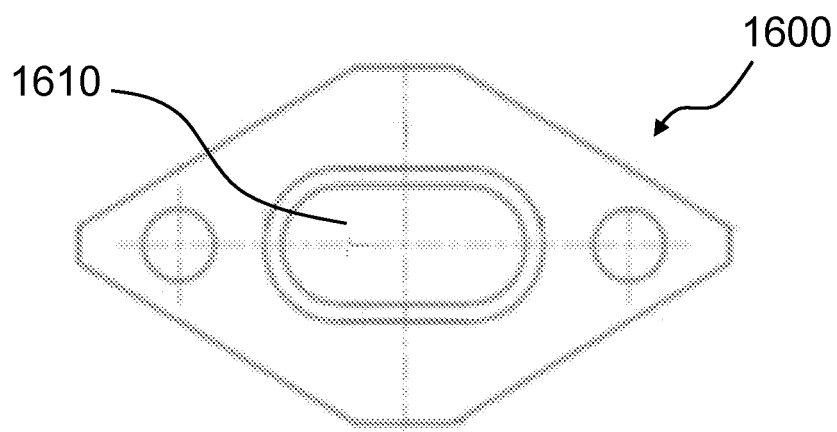
FIGS. 16A and 16B are side and top views, respectively, of an exemplary die holder according to the present disclosure.
Figure 16B:
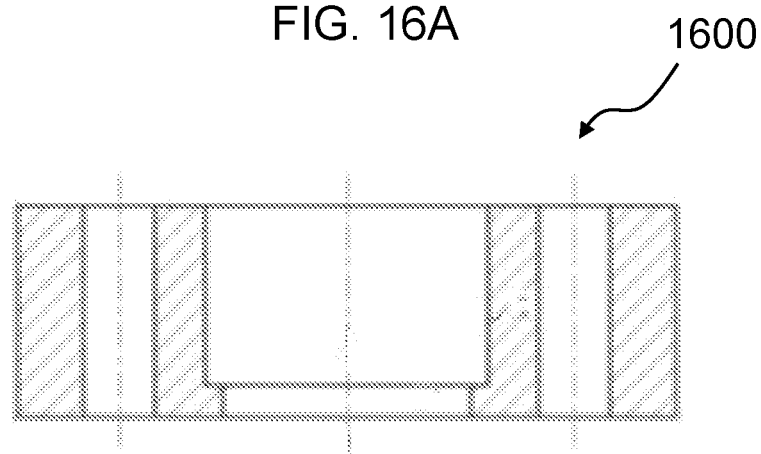

The extruder can in some aspects include a die holder 1600 such as that illustrated in FIGS. 16A and 16B. The die holder 1600 may include a cutout 1610 for receiving a die (e.g., die 1500) including a plurality of orientation channels that is sized to fit within the die holder 1600. The die holder can include any combination and number of the various configurations of orientation channels such as those shown in the dies described herein.

Figure 17A:
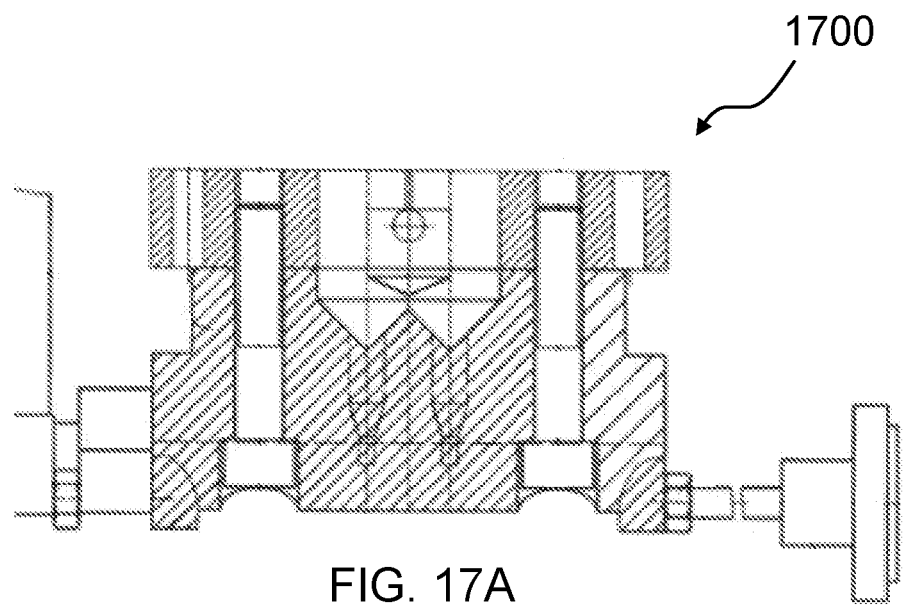
FIG. 17A shows an extruder die head with a breaker-plate removed.
Figure 17B:
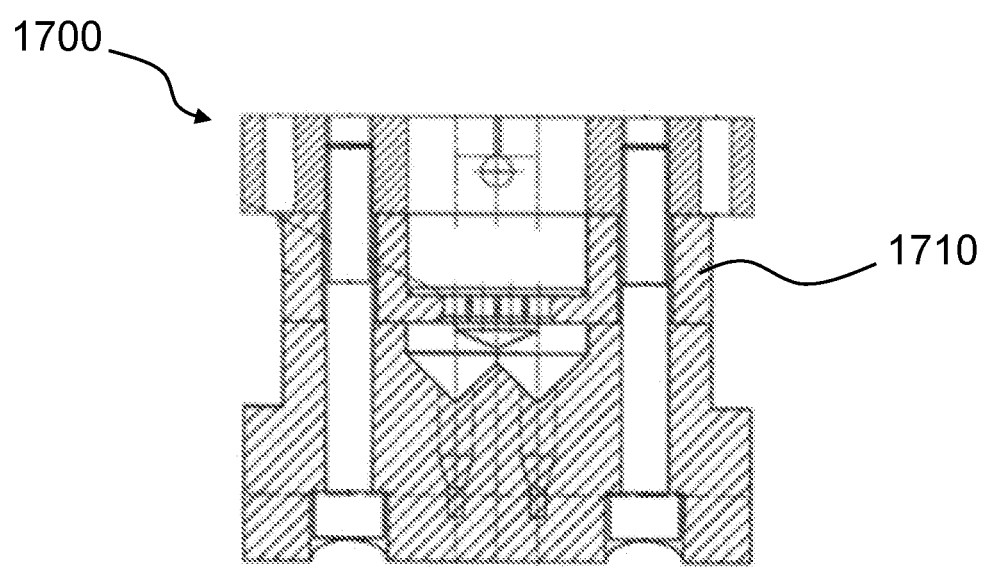
FIG. 17B shows an extruder die head with a breaker-plate inserted.

In some aspects the die holder 1600 is arranged at a distal end of an extruder. The die holder 1600 may be incorporated into the extruder in a similar manner as a conventional breaker-plate assembly, such as shown in FIGS. 17A and 17B which illustrate an extruder die head 1700 with a breaker-plate removed (FIG. 17A) and with the breaker-plate 1710 inserted (FIG. 17B). The inclusion of a die holder with a plurality of orientation channels allows for a large volume production/throughput of fiber/fibrils.

Aspect 15. A method of product manufacture, the method comprising, consisting of, or consisting essentially of: communicating a molten feed composition comprising a thermoplastic matrix polymer through a die according to any of aspects 1-14 so as to give rise to a die product. Suitable thermoplastic matrix polymers are described elsewhere herein.

Aspect 16. The method of aspect 15, wherein the molten feed composition further comprises a reinforcement material.

Aspect 17. The method of aspect 16, wherein the reinforcement is present at from about 0.01 wt % to about 15 wt % as measured against the unit weight of the molten feed composition. The reinforcement material may comprise a polyolefin, a fluoropolymer, or any combination thereof. PTFE is considered an especially suitable reinforcement material.

Aspect 18. The method of any of aspects 15-17, wherein a plurality of the dies or the plurality of orientation channels are arranged in a die holder.

Aspect 19. The method of claim 18, wherein the die holder is arranged at a distal end of an extruder. The extruder may in some aspects be a twin screw extruder.

The dies may, as described elsewhere herein, orient the reinforcement material so as to fibrillate the reinforcement material. Fibrils of a fibrillated reinforcement material may have a cross-sectional dimension (e.g., diameter) in the range of from about 1-100 nm. In one aspect, fibrils may have an average diameter of 5 nanometers to 2 micrometers, or about 5 nanometers to about 2 micrometers, e.g., 30 to 750 nanometers, or from about 30 to about 750 nanometers, more specifically, 5 to 500 nanometers, or from about 5 to about 500 nanometers.

Aspect 20. A die product, the die product comprising, consisting of, or consisting essentially of: a thermoplastic matrix polymer communicated through a die according to any of aspects 1-14.

Aspect 21. The die product of aspect 20, the die product further comprising a reinforcement material.

Aspect 22. The die product of aspect 21, wherein the reinforcement material comprises polytetrafluoroethylene.

Aspect 23. The die product of aspect 20, wherein the thermoplastic matrix material comprises poly(butylene terephthalate).

A die product may be characterized as a fiber; fibers may have circular or essentially circular cross sections in some aspects. A fiber may have a cross section in the range of from about 2 micrometers to about 4 mm. As one example, a die may produce a filament having a diameter in the range of from about 2 to about 200 micrometers. In some aspects, the die product may have a diameter in the range of from about 0.3 to about 4 mm. A die product may also be characterized as a tape and may have a rectangular, oval, or otherwise oblong cross-section.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Figure 12:
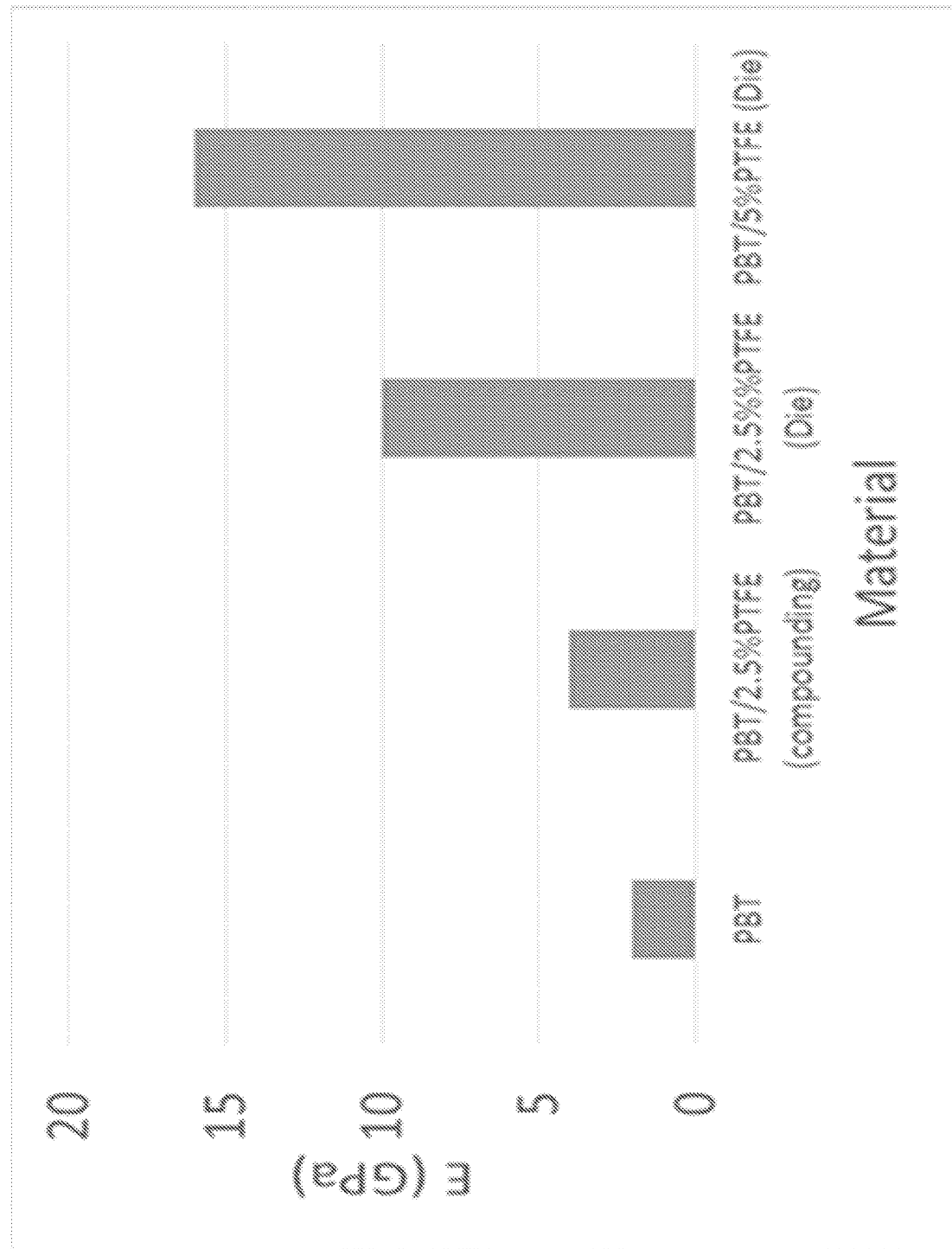
FIG. 12 provides exemplary E (GPa) results for fibril-containing materials made according to the present disclosure.

FIG. 12 provides E (GPa) data for a variety of materials made according to the present technology. As shown, dies according to the present disclosure provided materials—at the same composition—that exhibit E values more than double the value of a corresponding composition when compounded according to existing technologies. Data labeled with "Die" on are tapes made from the disclosed dies; the tapes may have dimensions of 5 mm width and 1 mm thickness, which dimensions correspond to the exit dimensions of the dies. The DMA testing standard was ISO6721-11. The compounded reference samples are made using injection molding (dimensions 10 mm by 3 mm) and measured using the DMA testing standard of the tapes.

Figure 13:
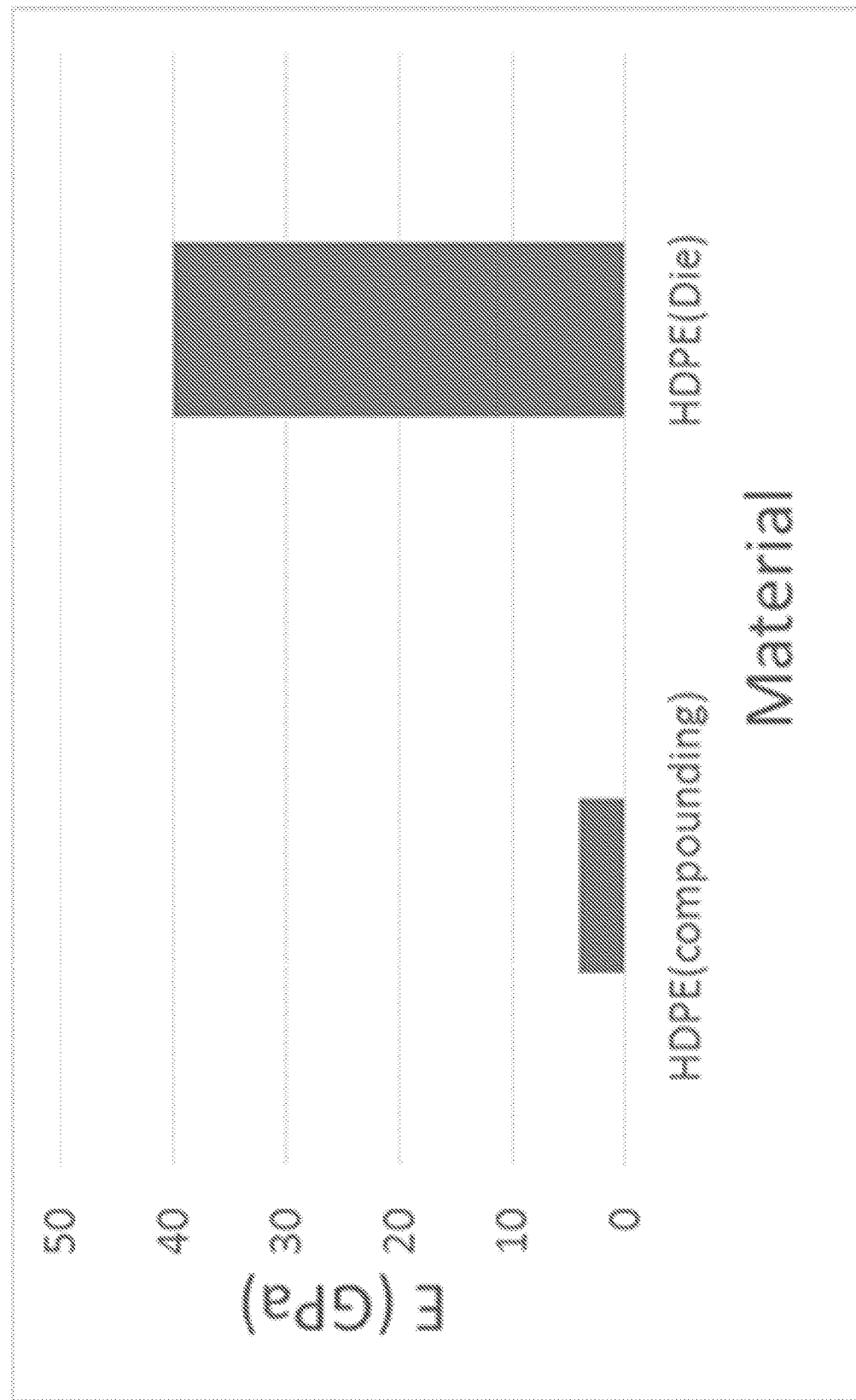
FIG. 13 provides exemplary E (GPa) results for polymeric matrix materials made according to the present disclosure.

FIG. 13 provides modulus E (GPa) data for HDPE materials (with no reinforcement materials within) processed via existing compounding technology and via dies according to the present disclosure. As shown, the disclosed dies provided materials that exhibited E values several times the values of corresponding composition compounded according to existing technologies.

Figures 18A, 18B:
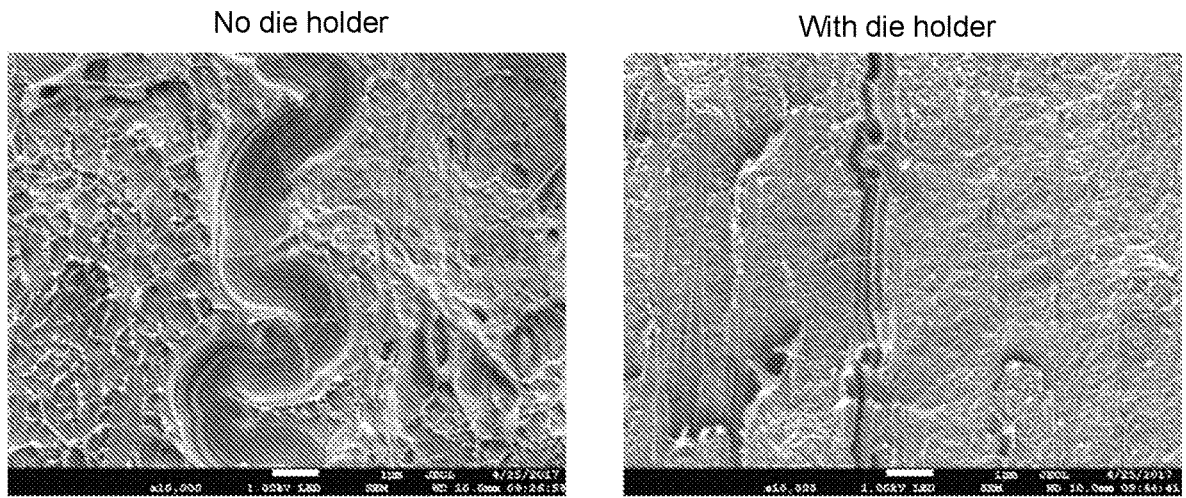
FIG. 18A is a scanning electron microscope (SEM) micrograph showing extruded PTFE fibers formed without a die/die holder.
FIG. 18B is a SEM micrograph showing extruded PTFE fibers formed with a die/die holder according to the present disclosure.
Figure 19:
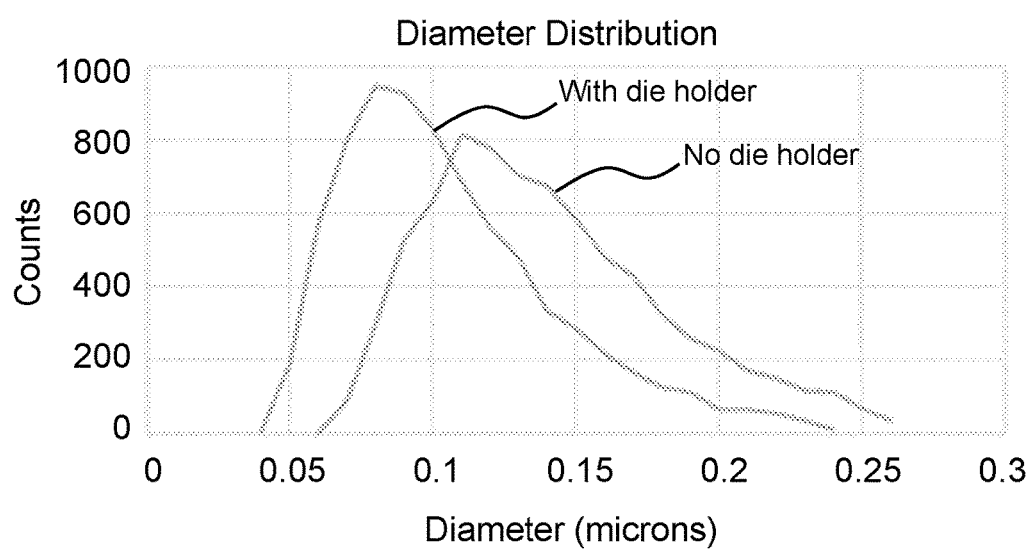
FIG. 19 is a histogram comparing PTFE fibers formed using a die/die holder according to the present disclosure to those formed without a die/die holder.

FIGS. 18A and 18B are scanning electron microscope (SEM) micrographs, and FIG. 19 is a corresponding histogram, comparing fibers (in this case PTFE) formed using a die/die holder according to that described in the disclosure (see FIG. 15 and the description above) to those formed without a die/die holder. The SEM micrographs (FIG. 18A shows a fiber formed without the die/die holder and FIG. 18B shows a fiber formed with the die/die holder) and the corresponding histogram show that by using the die and die holder the diameter of the fibrillated PTFE is considerably reduced. The mean diameter of the fibers formed with the die/die holder is about 80 nanometers (nm) and about 120 nm under standard extrusion conditions (i.e., without the die/die holder).

For the diameter distribution determination, the PTFE fiber width measurement was conducted on the acquired SEM images in a batch-processing manner over all images after de-noising and normalization. The fiber detection was first performed with a fixed threshold on the pre-processed images, which changes the original gray-level images to binary images. To evade the fiber entanglement, regional analysis was conducted instead of separating the individual fiber branches from fiber networks. The inner-boundary distance was calculated for each region covered by the detected fibers. The distance grows from the edge of the detected region towards the nearest nonzero pixels in the binary image based on Fast Marching Method (FMM) (R, van Uitert and I. Bitter, Medical Physics, 34 (2), 2007), where the distance is initiated as zero at the edge and penetrates with the Euclidean distance growing (towards the next neighbor). Based on the distance map, the centerline of each branches can be derived, which are located at local maxima of the distance map. As such, the crossings of fibers can also be also identified as the connection of different branches. The width of each branch can then be calculated along the centerlines over the distance map, avoiding the crossings.

Figure 20A:
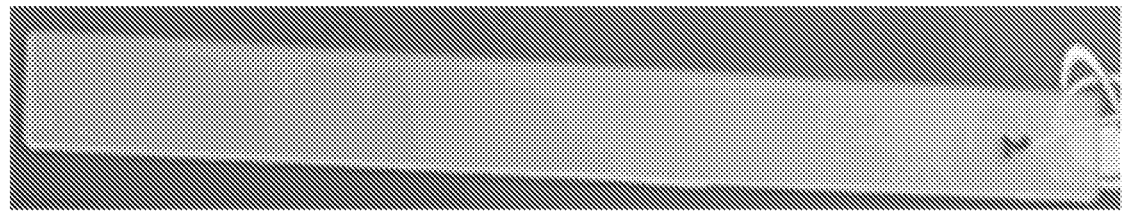
FIG. 20A is a photograph of a Lexan™ sample including styrene and acrylonitrile (SAN)-encapsulated PTFE formed using a die/die holder according to the present disclosure.
Figure 20B:
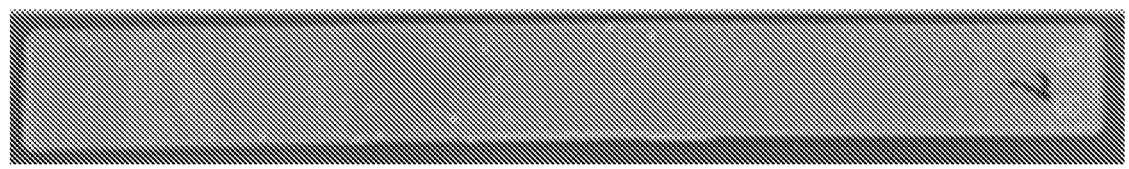
FIG. 20B is a photograph of a Lexan™ sample including styrene and acrylonitrile (SAN)-encapsulated PTFE formed without a die/die holder.
Figure 21A:
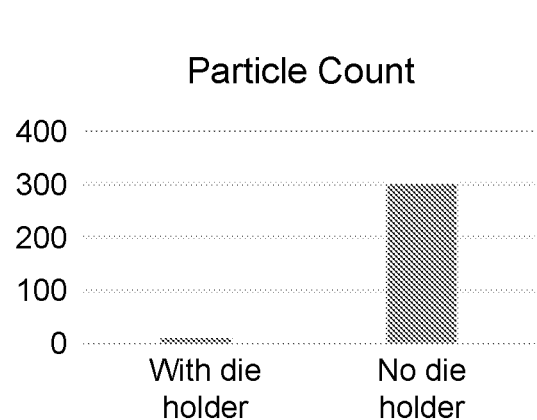
FIGS. 21A and 21B provide particle count and average diameter results for the samples shown in FIGS. 20A and 20B.
Figure 21B:
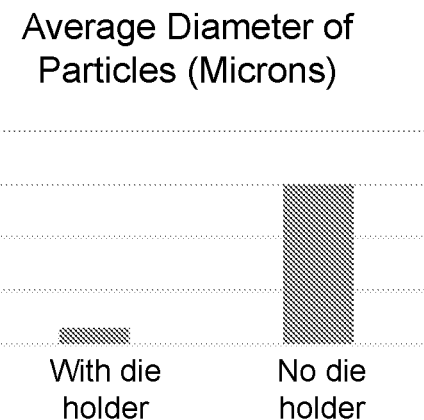

FIGS. 20A and 20B illustrate samples of Lexan™ 916 (A FR grade) extruded with SAN-encapsulated PTFE (TSAN) with a die/die holder (FIG. 20A) and without a die/die holder (FIG. 20B). It is evident from the figures that the sample extruded using the die/die holder was "cleaner" with better dispersion and smaller diameter particles and the sample extruded without the die/die holder included visible particles. The tables in FIGS. 21A and 21B confirm the visual data.

Figure 22A:
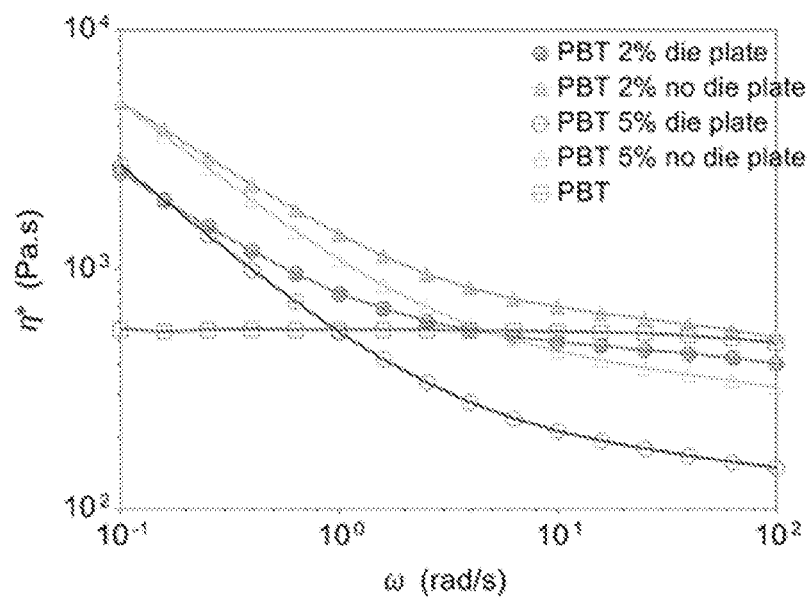
FIGS. 22A and 22B illustrate viscosity as a function of shear rate for extruded pellets that contain fibrillated PTFE (both with and without a die holder/plate) in polybutylene terephthalate (PBT) (FIG. 22A) and in polycarbonate (PC) (FIG. 22B) at 250° C.
Figure 22B:
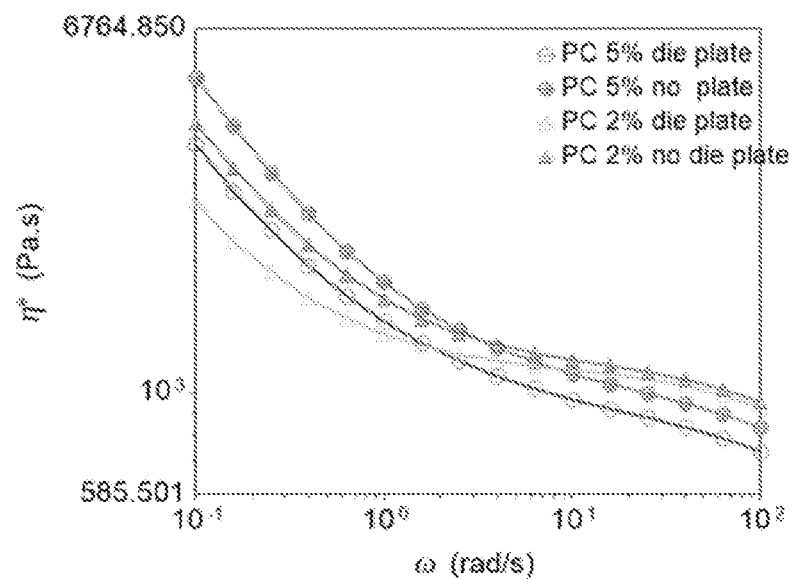

FIGS. 22A and 22B illustrate viscosity as a function of shear rate for extruded pellets that contain fibrillated PTFE (both with and without a die/die holder) in polybutylene terephthalate (PBT) (FIG. 22A) and in polycarbonate (PC) (FIG. 22B) at 250° C. The fine fibrils in the samples made with the die/die holder show lower viscosity both in high and low-shear rates. This allows the samples to be processed better, i.e. both in injection molding as well as for low-shear processing like blow-molding, fiber spinning, etc., which indicates that the material not only improves melt strength but also lowers high shear processing viscosity. Viscosity was measured in accordance with ISO 6721-10.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description as examples or aspects, with each claim standing on its own as a separate aspect, and it is contemplated that such aspects can be combined with each other in various combinations or permutations. The scope of the disclosure should be determined with reference to the appended claims, along with the full scope of equivalents to which such claims are entitled.

What is claimed:

1. A die, comprising:
   an entrance section comprising at least one inlet;
   the inlet being in fluid communication with an orientation section of the die, the orientation section comprising a plurality of orientation channels having a channel inlet and a channel outlet;
   a merging region, the merging region defining a receiving volume in fluid communication with the outlets of the plurality of orientation channels of the orientation section, the merging region being configured to merge together at least some fluid flows originating from the outlets of the orientation channels of the orientation section; and
   an exit region in fluid communication with the merging region, the exit region comprising at least one outlet,
   wherein at least some of the plurality of orientation channels include a hyperbolic-shaped region followed immediately by a linearly tapered region, wherein the hyperbolic-shaped region has an angle of curvature at its entrance of from 120 to 150 degrees, where the angle of curvature is the angle between a horizontal axis and a line tangent to the hyperbola at the entrance, and wherein each of the plurality of orientation channels, during operation, impose a Hencky strain of from about 2 to about 8 units over the length of the channel.

2. The die of claim 1, wherein at least some of the plurality of orientation channels independently have a length in a range of from about 4 millimeters (mm) to about 50 mm.

3. The die of claim 1, wherein at least two of the orientation channels converge.

4. The die of claim 1, wherein the outlets of the plurality of orientation channels are regularly spaced about one another at the merging region.

5. The die of claim 1, wherein at least two of the orientation channels do not converge.

6. The die of claim 1, wherein at least some of the orientation channels are arranged in a skew symmetric pattern.

7. The die of claim 1, wherein the merging region defines an at least partially spherical receiving volume or an at least partially polygonal receiving volume.

8. The die of claim 1, wherein the merging region is shaped so as to orient reinforcement agents in a flow direction originating from the orientation section into the merging region along the flow direction and in a direction transverse to the flow direction.

9. The die of claim 1, wherein the receiving volume defines a cross-sectional dimension that varies in the direction of the exit region.

10. The die of claim 1, wherein the outlet of the exit region defines a rectangular cross-section, an at least partially circular cross-section, or a polygonal cross-section.

11. The die of claim 1, wherein the entrance of the hyperbolic-shaped region has a hyperbolic curvature over about 1 to about 95% of the length of the orientation channel.

12. A method of fiber manufacture, comprising:
communicating a molten feed composition comprising a thermoplastic matrix polymer through a die of claim 1 so as to give rise to a product.

13. The method of claim 12, wherein the molten feed composition further comprises a reinforcement material.

14. The method of claim 13, wherein the reinforcement material is present at from about 0.01 wt % to about 15 wt % as measured against the unit weight of the molten feed composition.

15. The method of claim 12, wherein a plurality of the dies or the plurality of orientation channels are arranged in a die holder.

16. The method of claim 15, wherein the die holder is arranged at a distal end of an extruder.

* * * * *